United States Patent
Columbus

(10) Patent No.: US 12,195,198 B2
(45) Date of Patent: Jan. 14, 2025

(54) CARGO SYSTEMS FOR UNMANNED AIRCRAFT SYSTEMS AND METHODS OF USING SAME TO DELIVER CARGO

(71) Applicant: Roost LLC, Chicago, IL (US)

(72) Inventor: Brian Columbus, Naperville, IL (US)

(73) Assignee: Roost LLC, Chicago, IL (US)

( * ) Notice: Subject to any disclaimer, the term of this patent is extended or adjusted under 35 U.S.C. 154(b) by 176 days.

(21) Appl. No.: 18/184,449

(22) Filed: Mar. 15, 2023

(65) Prior Publication Data

US 2023/0294847 A1    Sep. 21, 2023

Related U.S. Application Data

(60) Provisional application No. 63/320,089, filed on Mar. 15, 2022.

(51) Int. Cl.

| | |
|---|---|
| *B64U 10/13* | (2023.01) |
| *B64D 9/00* | (2006.01) |
| *B65G 51/02* | (2006.01) |
| *B64F 1/32* | (2006.01) |
| *B64U 70/90* | (2023.01) |
| *B64U 101/64* | (2023.01) |

(52) U.S. Cl.
CPC .............. *B64D 9/00* (2013.01); *B65G 51/02* (2013.01); *B64F 1/32* (2013.01); *B64U 10/13* (2023.01); *B64U 70/90* (2023.01); *B64U 2101/64* (2023.01); *B65G 2812/16* (2013.01)

(58) Field of Classification Search
None
See application file for complete search history.

(56) References Cited

U.S. PATENT DOCUMENTS

| | | | |
|---|---|---|---|
| 9,527,605 B1 | 12/2016 | Gentry et al. | |
| 10,689,111 B2* | 6/2020 | von Gostomski | B64D 1/12 |
| 10,835,070 B2* | 11/2020 | Russell | B64D 1/10 |
| 10,919,702 B1* | 2/2021 | Berta | B65G 11/04 |
| 11,111,076 B1* | 9/2021 | Campbell | B65G 67/08 |
| 12,026,660 B2* | 7/2024 | Clarke | B60P 3/007 |
| 12,059,089 B1* | 8/2024 | Dunn | B64C 39/024 |
| 12,100,853 B2* | 9/2024 | Gil | B64U 60/00 |
| 2015/0175276 A1* | 6/2015 | Koster | A47G 29/14 |
| | | | 244/114 R |
| 2017/0320685 A1* | 11/2017 | Hoofard | E06B 3/44 |
| 2018/0336512 A1* | 11/2018 | Clarke | G07F 17/12 |
| 2019/0133363 A1* | 5/2019 | Burchat | A47G 29/141 |
| 2019/0300202 A1* | 10/2019 | High | B64F 1/32 |

(Continued)

FOREIGN PATENT DOCUMENTS

WO    WO-2024047632 A1 *   3/2024

OTHER PUBLICATIONS

Antunes, J., "Drone-in-a-Box Solutions: What's Out There?," available at https://www.commercialuavnews.com/surveying/drone-in-a-box-solutions-what-s-out-there (Aug. 12, 2021), 8 pages.

(Continued)

*Primary Examiner* — Joseph A Dillon, Jr.
(74) *Attorney, Agent, or Firm* — Incubate IP; Randy R. Micheletti

(57) ABSTRACT

The present disclosure provides cargo systems for unmanned aircraft systems ("UAS") such as drones, and method of using same to deliver (e.g., load, transport, and unload) cargo.

20 Claims, 36 Drawing Sheets

(56) References Cited

U.S. PATENT DOCUMENTS

| | | | | |
|---|---|---|---|---|
| 2021/0114729 | A1* | 4/2021 | Ragan | B64D 9/00 |
| 2021/0284451 | A1* | 9/2021 | Burchat | B65G 11/063 |
| 2022/0017222 | A1* | 1/2022 | Benner | B64U 80/25 |
| 2022/0106058 | A1* | 4/2022 | Zhou | B64F 1/368 |
| 2022/0243524 | A1* | 8/2022 | Hoofard | E05F 15/665 |
| 2022/0315246 | A1* | 10/2022 | Gil | B64D 1/12 |
| 2022/0356019 | A1* | 11/2022 | Teoli | B65G 11/20 |
| 2023/0101244 | A1* | 3/2023 | Seki | B64F 1/32 |
| | | | | 414/288 |
| 2023/0159192 | A1* | 5/2023 | Gil | B64U 80/25 |
| | | | | 244/137.1 |
| 2024/0017860 | A1* | 1/2024 | Wyrobek | B64U 10/60 |
| 2024/0076144 | A1* | 3/2024 | Fukuda | B65G 39/10 |

OTHER PUBLICATIONS

Dronehub, "Dronehub docking station—high-end, heavy-duty solution for all-weather conditions," available at https://dronehub.ai/solutions/ (downloaded Nov. 8, 2022), 2 pages.

Dronehub, "Dronehub is the autonomous game-changer for inspection and monitoring," available at https://dronehub.ai/ (downloaded Nov. 8, 2022), 6 pages.

Dronehub, "Dronehub.ai Booklet: Automated industrial drones, all-weather hubs, and AI-powered software for inspections, deliveries and data collection," available at https://dronehub.ai/resource-library/ (downloaded Nov. 8, 2022), 3 pages.

Dronehub, "Dronehib.ai Case Study—usability of the Dronehub system for cities and towns," available at https://dronehub.ai/resource-library/ (downloaded Nov. 8, 2022), 8 pages.

Dronehub, "Dronehub.ai Specification Sheet," available at https://dronehub.ai/resource-library/ (downloaded Nov. 8, 2022), 3 pages.

* cited by examiner

CARGO SYSTEMS FOR UNMANNED AIRCRAFT SYSTEMS AND METHODS OF USING SAME TO DELIVER CARGO

PRIORITY CLAIM

This application claims priority to U.S. Provisional Patent Application Ser. No. 63/320,089, filed on Mar. 15, 2022, the entire contents of which are incorporated herein by reference and relied upon.

FIELD

The present disclosure provides cargo systems for unmanned aircraft systems ("UAS") such as drones, and method of using same to deliver (e.g., load, transport, and unload) payload.

BACKGROUND

UAS such as drones are quickly becoming popular methods for transporting small items. But loading and unloading payloads onto UAS is a complex process currently performed by hand, reducing potential efficiencies and cost savings that otherwise might be realized from UAS delivery services.

A need persists for improved systems that enable semi-automated and automated loading and unloading of UAS payloads.

SUMMARY

In one embodiment, the present disclosure provides a cargo delivery system comprising: an unmanned aircraft system including a cargo cradle configured to receive a payload; and a loading system including: a loading dock configured to reversibly mate with the cargo cradle, a packing area disposed remote from the loading dock and configured to receive the payload, and a conveying duct in operable communication with the loading dock and the packing area and configured to convey the payload from the packing area to the loading dock.

In another embodiment, the present disclosure provides a cargo cradle for delivering cargo by UAS, the cargo cradle comprising: a shell including side walls; a payload hold area disposed within the shell and configured to receive payload therein; a first opening in a first side wall and in operative communication with the payload hold area, wherein the first opening is sized and shaped to enable the payload to pass therethrough; and a second opening in a second side wall and in operative communication with the cargo hold area, wherein the second opening is configured to enable air but not the payload to pass therethrough.

In other embodiments, the present disclosure provides an unmanned aircraft system comprising: a body portion; at least one propeller disposed above the body portion; and a cargo cradle disposed generally below the body portion and comprising: a plurality of sides that, together, form a wedge-shaped shell, a first opening disposed through the wedge-shaped shell and configured to enable a payload to pass therethrough, and a second opening disposed through the wedge-shaped shell and configured to enable air but not the payload to pass therethrough.

In other embodiments, the present disclosure provides a loading dock comprising a basket including: a plurality of sides that, together, form a wedge shape, a first opening disposed through a first side sized and shaped to enable a payload to pass therethrough, and a second opening disposed through a second side and configured to enable air but not the payload to pass therethrough.

In other embodiments, the present disclosure provides a method of sending payload by UAS to a predetermined destination, the method comprising: coupling the cargo cradle of a UAS as disclosed herein to a first loading dock; causing a payload to pass through the first side wall of the loading dock and into the cargo cradle of the UAS; and thereafter uncoupling the UAS from the first loading dock; causing the UAS to travel to a predetermined destination that is remote from the first loading dock; and causing the payload to be removed from the cargo cradle of the UAS.

DETAILED DESCRIPTION

Figure 1:
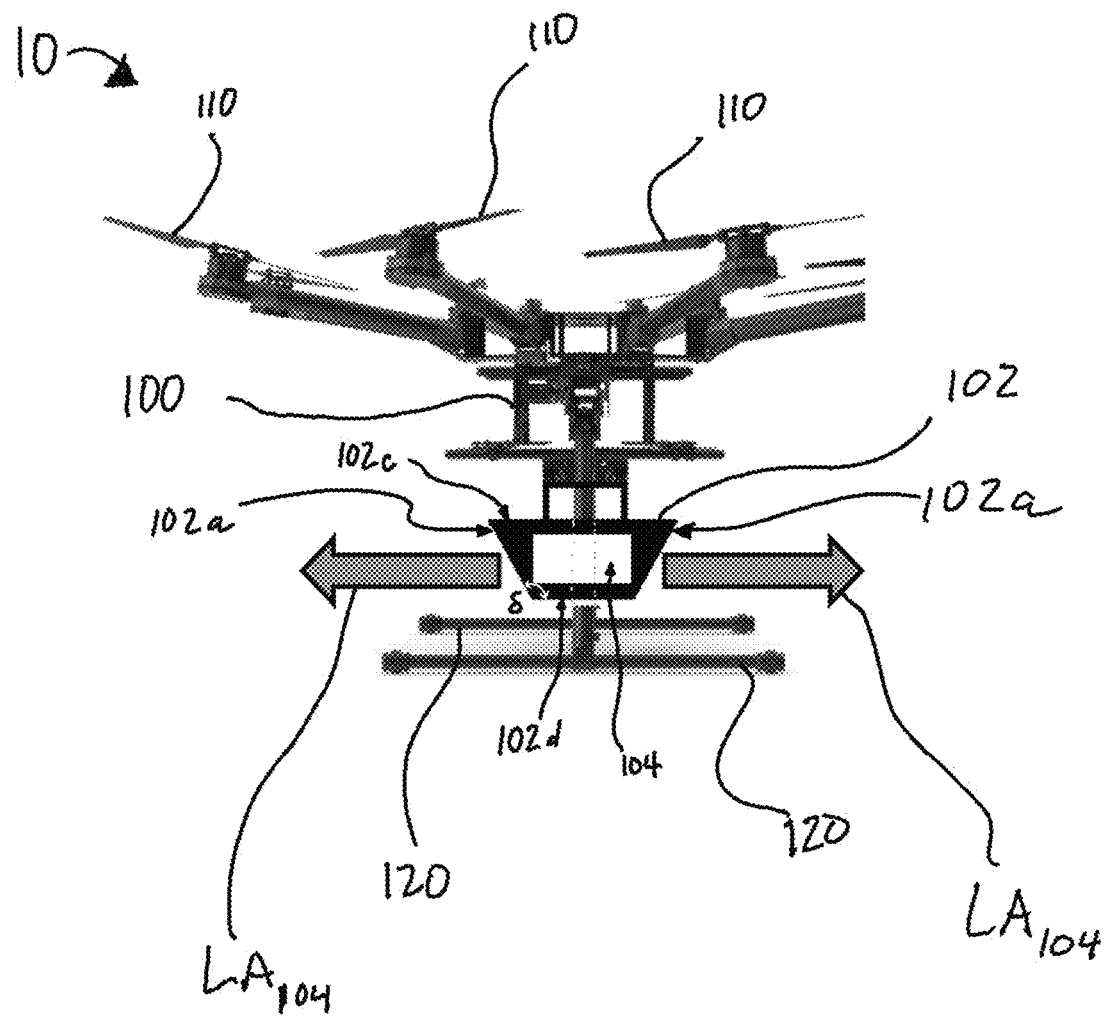
FIG. 1 shows a port side view of an unmanned aircraft system consistent with one embodiment of the present disclosure. The starboard side of the unmanned aircraft system is a substantial mirror image of the view of FIG. 1.

Referring generally to FIGS. 1-39, the present disclosure provides systems configured to enable convenient automatic or semi-automatic loading and unloading of payload from a UAS (e.g., drone). Systems consistent with the present disclosure generally comprise at least one UAS 10, and at least one loading system 20 that includes at least one loading dock 200.

1. Cargo Cradles and Unmanned Aircraft Systems ("UAS")

The present disclosure provides unmanned aircraft systems 10 configured to carry a payload 30 and to selectively couple and uncouple with a loading dock 200.

Referring now specifically to FIGS. 1-3, 17-23, and 28-37, UAS 10 consistent with the present disclosure generally include a body portion 100, a cargo cradle 102 disposed below the body portion 100, and at least one propeller 110 disposed even with or above the body portion 100. In other embodiments, the UAS 10 is a fixed wing unmanned aircraft that does not include a propeller. The body portion 100 may house a battery, a control unit configured to control the propeller(s) 110 and/or propulsion system, a signal receiver (not shown), a signal transducer (not shown), a GPS receiver, a camera, LIDAR, vertical guidance systems, etc. In some embodiments, the UAS 10 is a commercially available drone. In some embodiments, the UAS 10 is a certified aircraft under relevant regulation(s). For example and without limitation, the UAS 10 may be an aircraft certified under United States Federal Aviation Administration (FAA) Regulation Part 21, Part 23, or Part 25. In other embodiments, the UAS 10 is certified or certifiable for Beyond Visual Line of Sight status (e.g., has received or is configured to receive a waiver from United States Federal Aviation Administration (FAA) Regulation Part 107, promulgated at 14 C.F.R. Part 107). In other embodiments, the UAS 10 is certified or certifiable for under any regulation that supersedes or renders obsolete FAA Regulation Part 107, such as proposed United States Federal Aviation Administration (FAA) Regulation Part 108, to be promulgated at 14 C.F.R. Part 108. In some embodiments, the UAS 10 may optionally include one or more landing supports 120 for supporting the UAS 10 on a flat or substantially flat surface. When present, the landing support(s) 120 may be disposed such that the bottom surface of the landing support(s) 120 are coplanar with, substantially coplanar with, or below the plane of the base $102d$ of the cargo cradle 102.

In some embodiments, the UAS 10 does not primarily rely on landing support(s) 120 to mate with a loading dock 200. In such embodiments, the UAS 10 may instead primarily rely on the cargo cradle 102 to support (e.g., substantially support or fully support) the UAS 10 when the UAS 10 mates with a loading dock 200. In some such embodiments, the UAS 10 additionally includes one or more landing support(s) 120, optionally configured to retract such that the distal end of each landing support 120 is higher in elevation than the bottom surface $102d$ of the associated cargo cradle 102. In some such embodiments, the one or more landing support(s) 120 are each configured to retract such that the distal end of each landing support 120 is higher in elevation than the top surface $102c$ of the cargo cradle 102.

In some embodiments, the UAS 10 does not include any landing support(s) 120, but instead relies solely on the cargo cradle 102 to support the UAS 10 (e.g., in a stable upright configuration) when the UAS 10 is resting on a surface.

The cargo cradle 102 is configured to secure (e.g., temporarily secure) a payload 30 to be transported by the UAS 10. The cargo cradle 102 may, in some embodiments, be configured to enable the cargo 30 to be slid into and/or out of a payload hold area 104 as desired.

In some embodiments, the cargo cradle 102 includes a payload hold area 104 configured to temporarily secure a payload 30. The payload hold area 104 may be a hollow void within the cargo cradle 102 sized and shaped to accommodate a payload 30. In some embodiments, the payload hold area 104 may have a generally tubular shape to accommodate a payload 30 having a complementary 3-dimensional shape. For example and without limitation, the tubular shape of the payload hold area 104 may be generally cylindrical (e.g., circular cylindrical or oval cylindrical) to accommodate a payload 30 having a generally cylindrical shape or a generally round shape (e.g., having a generally circular, oval or rounded cross-sectional shape). In the embodiment specifically shown in FIGS. 1-3, for example, the payload hold area 104 has a generally circular cylindrical shape. In other embodiments, such as embodiments generally consistent with FIGS. 28-30, the generally tubular shape of the payload hold area 104 is rectangular (e.g., a square duct shape). In some embodiments, such as embodiments generally consistent with FIGS. 21-23, the generally tubular shape of the payload hold area 104 is trapezoidal.

The cargo cradle may be defined by a plurality of walls 102a, 102b; a top 102c disposed at the top edge of the walls 102a, 102b; and a bottom 102d disposed at the bottom edge of the walls 102a, 102b.

Figure 2:
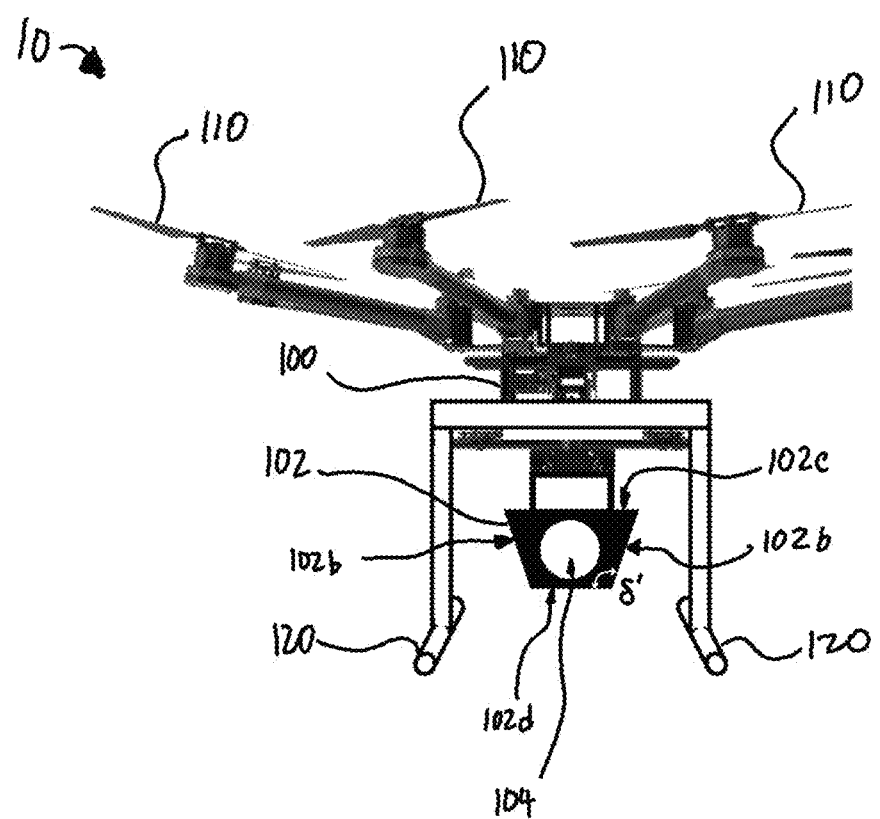
FIG. 2 shows a front view of the UAS of FIG. 1.

One of the walls 102a may have an opening 105 sized and shaped to enable the payload 30 to pass therethrough, for example to enter or exit the payload hold area 104. The opening 105 may have a similar or the same shape as the cross-sectional shape of the payload hold area 104. For example, as shown in FIG. 2, the opening 105 has a generally circular cross-sectional shape and substantially matches the substantially circular cross-sectional shape of the payload hold area 104. The opening 105 and the payload hold area 104 may define a loading axis $LA_{104}$ of the cargo cradle 102, that is, the general direction that a payload 30 moves to be loaded into or removed from the payload hold area 104.

One wall 102a, 102b may have a second opening 106 configured to enable air to pass therethrough, but not to enable the payload 30 to pass therethrough. For example and without limitation, the second opening 106 may have a smaller size, a different shape, a barrier (e.g., a screen), or any combination of the foregoing compared to the first opening 105 to prevent the payload 30 from exiting through the second opening 106 but while enabling air to pass easily through the second opening 106.

Figure 3:
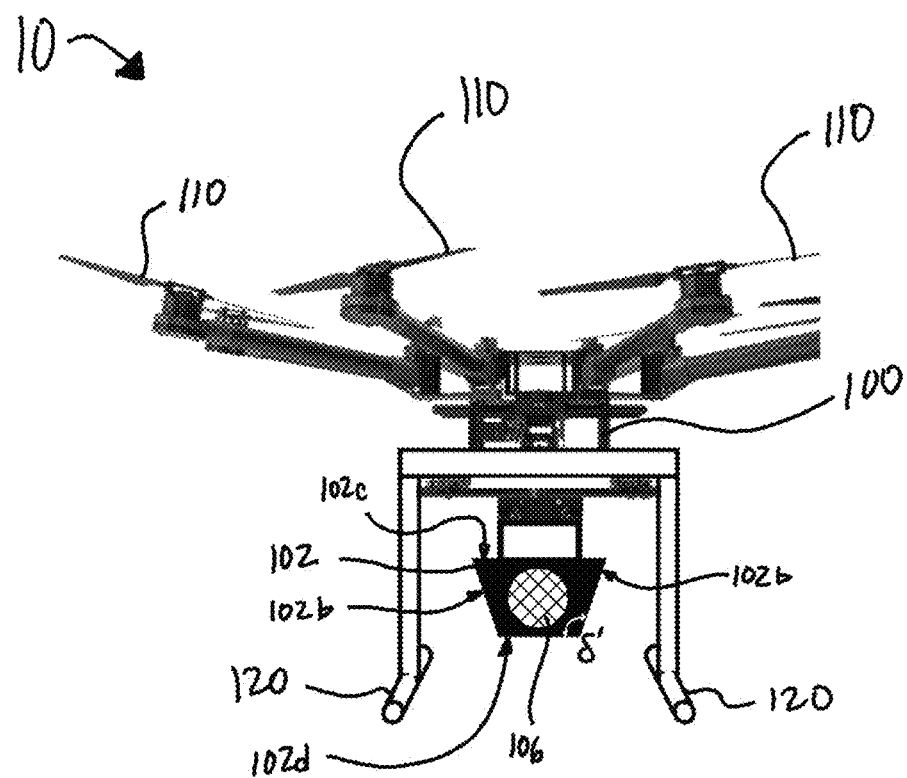
FIG. 3 shows a rear view of the UAS of FIG. 2.

In some embodiments, such as those generally consistent with the representative embodiment shown in FIGS. 1-3, the cargo cradle 102 has an inverted truncated pyramidal shape with a side wall 102a extending upward from the base 102d at an angle δ. In some embodiments, the angle δ is obtuse (e.g., about 90° to about180°), for example about 105° to about 165°, about 110° to about 160°, about 115° to about 155°, about 120° to about 150°, about 125° to about 145°, or about 130° to about 140°. In some embodiments the angle δ is selected from the group consisting of: about 95°, about 96°, about 97°, about 98°, about 99°, about 100°, about 101°, about 102°, about 103°, about 104°, about 105°, about 106°, about 107°, about 108°, about 109°, about 110°, about 111°, about 112°, about 113°, about 114°, about 115°, about 116°, about 117°, about 118°, about 119°, about 120°, about 121°, about 122°, about 123°, about 124°, about 125°, about 126°, about 127°, about 128°, about 129°, about 130°, about 131°, about 132°, about 133°, about 134°, about 135°, about 136°, about 137°, about 138°, about 139°, about 140°, about 141°, about 142°, about 143°, about 144°, about 145°, about 146°, about 147°, about 148°, about 149°, about 150°, about 151°, about 152°, about 153°, about 154°, about 155°, about 156°, about 157°, about 158°, about 159°, about 160°, about 161°, about 162°, about 163°, about 164°, about 165°.

In embodiments where the inverted truncated pyramidal shape has a different width than length (e.g., the truncated pyramidal shape is not a truncated square pyramidal shape), a second wall 102b extends upwards from the base 102d at a second angle δ' that is different from (e.g., greater than or less than) the first angle δ. In some embodiments, the second angle δ' is obtuse (e.g., about 90° to about 180°), for example about 105° to about 165°, about 110° to about 160°, about 115° to about 155°, about 120° to about 150°, about 125° to about 145°, or about 130° to about 140°. In some embodiments the second angle δ' is selected from the group consisting of: about 95°, about 96°, about 97°, about 98°, about 99°, about 100°, about 101°, about 102°, about 103°, about 104°, about 105°, about 106°, about 107°, about 108°, about 109°, about 110°, about 111°, about 112°, about 113°, about 114°, about 115°, about 116°, about 117°, about 118°, about 119°, about 120°, about 121°, about 122°, about 123°, about 124°, about 125°, about 126°, about 127°, about 128°, about 129°, about 130°, about 131°, about 132°, about 133°, about 134°, about 135°, about 136°, about 137°, about 138°, about 139°, about 140°, about 141°, about 142°, about 143°, about 144°, about 145°, about 146°, about 147°, about 148°, about 149°, about 150°, about 151°, about 152°, about 153°, about 154°, about 155°, about 156°, about 157°, about 158°, about 159°, about 160°, about 161°, about 162°, about 163°, about 164°, about 165°.

In some embodiments, the inverted truncated pyramidal shape is an inverted truncated rectangular pyramid. In some embodiments, the inverted truncated pyramidal shape is not an inverted truncated square pyramid. Cargo cradles 102 having an inverted truncated pyramidal shape where the base is not a regular polygon may be advantageous in that a UAS 10 incorporating an inverted truncated pyramidal shape where the base is not a regular polygon has fewer potential proper coupling orientations with a loading dock 200 (described in greater detail below). Nonetheless, in some embodiments the inverted truncated pyramid may have a geometrical base that is a regular polygon (e.g., a square, a regular pentagon, a regular hexagon, a regular heptagon, a regular octagon, etc.).

In other embodiments, such as embodiments consistent with those shown representatively in FIGS. 17-23, FIGS. 28-30, and FIGS. 34-37, the cargo cradle 102 may include one or more curved contours, for example to improve aerodynamics and/or extend battery life of the UAS 10. In some embodiments, the bottom surface 102d of the cargo cradle 102 includes a curved contour configured to mate with a curved contour of a corresponding basket 204. In some embodiments, the top surface 102c of the cradle 102 includes a curved contour. The curved contour(s) may be spherical, oval, parabolic, a truncated portion of any of the foregoing, or any combination thereof. In some embodiments, the cargo cradle 102 has a spherical or hemispherical or truncated spherical shape. In some embodiments, the cargo cradle 102 has an oval shape or a semi-oval shape. In other embodiments, the cargo cradle 102 has an almond (e.g., vesica piscis) shape or a semi-almond shape.

In embodiments wherein the cargo cradle 102 includes a curved upper contour 102c, such as shown representatively in FIGS. 17-20, it may be advantageous for the payload hold area 104 to be disposed near, at, or below (e.g., entirely below) an inflection point 102p corresponding to the point (e.g., perimeter) at which the upper surface 102c of the cargo cradle 102 begins to curve. In such embodiments, the shape of the corresponding basket 204 may more conveniently enable coupling with the cargo cradle 102 and pneumatic communication between the associated ducts 210 and the payload hold area 104.

Figure 21:
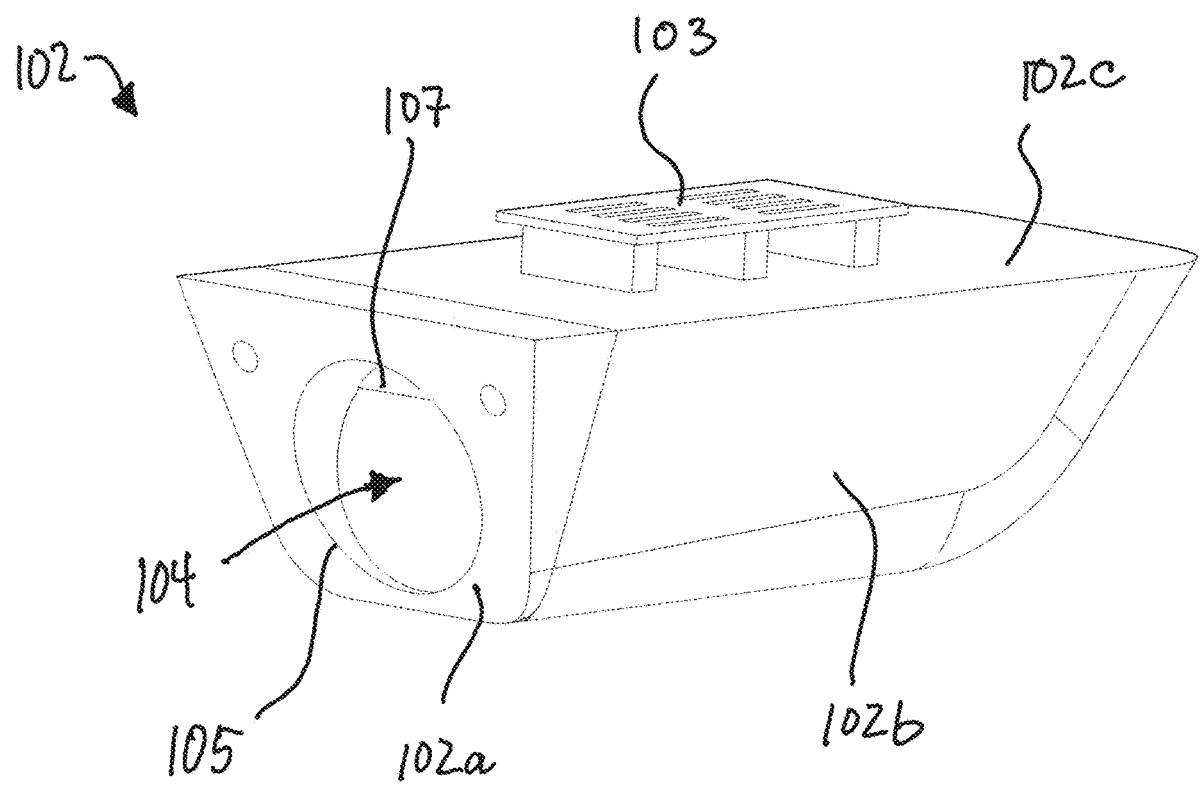
FIG. 21 shows a perspective view of a cargo cradle component consistent with one embodiment of the present disclosure that is suitable for use with a UAS.
Figure 22:
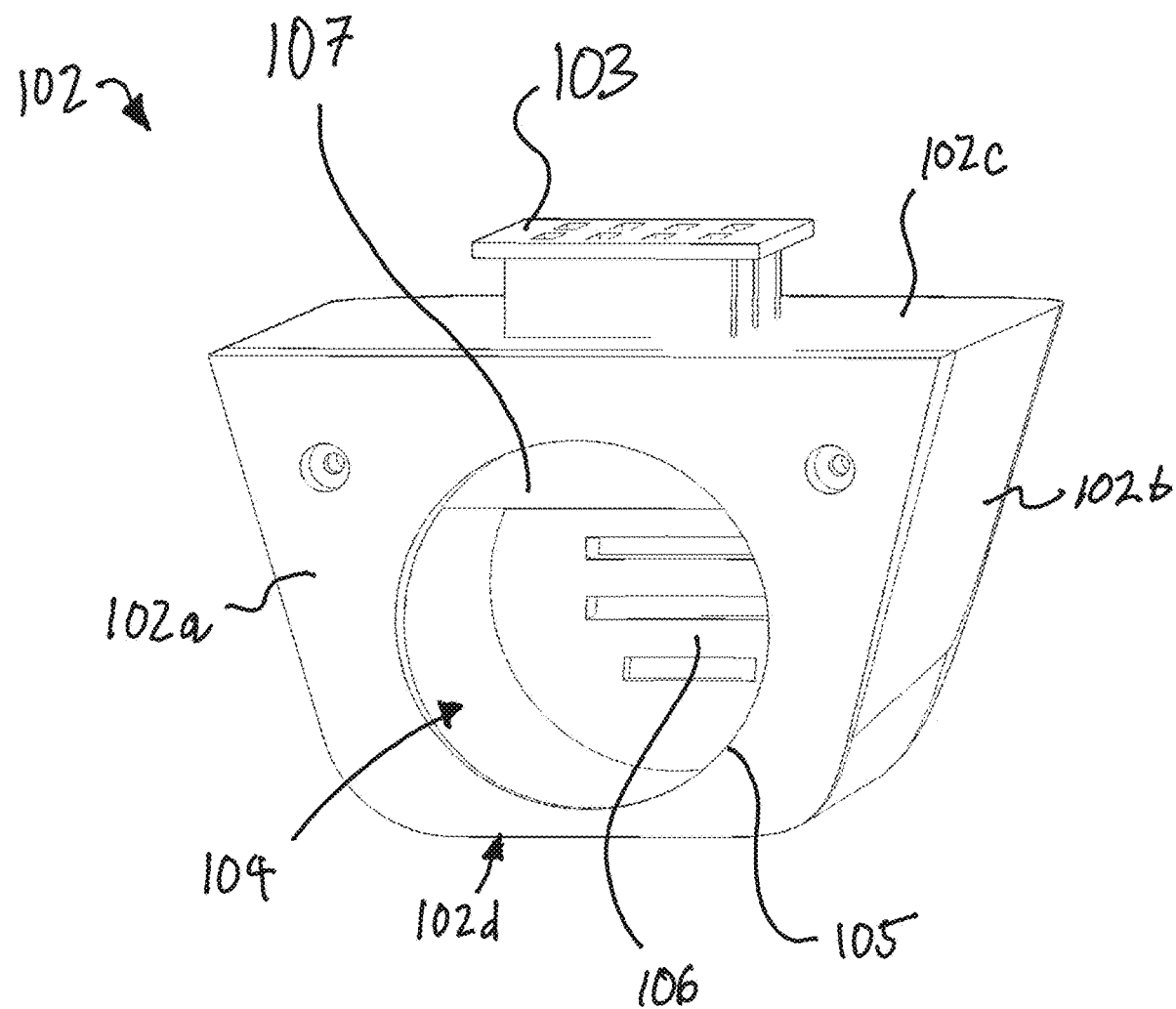
FIG. 22 shows a front perspective view of the cargo cradle of FIG. 21.
Figure 23:
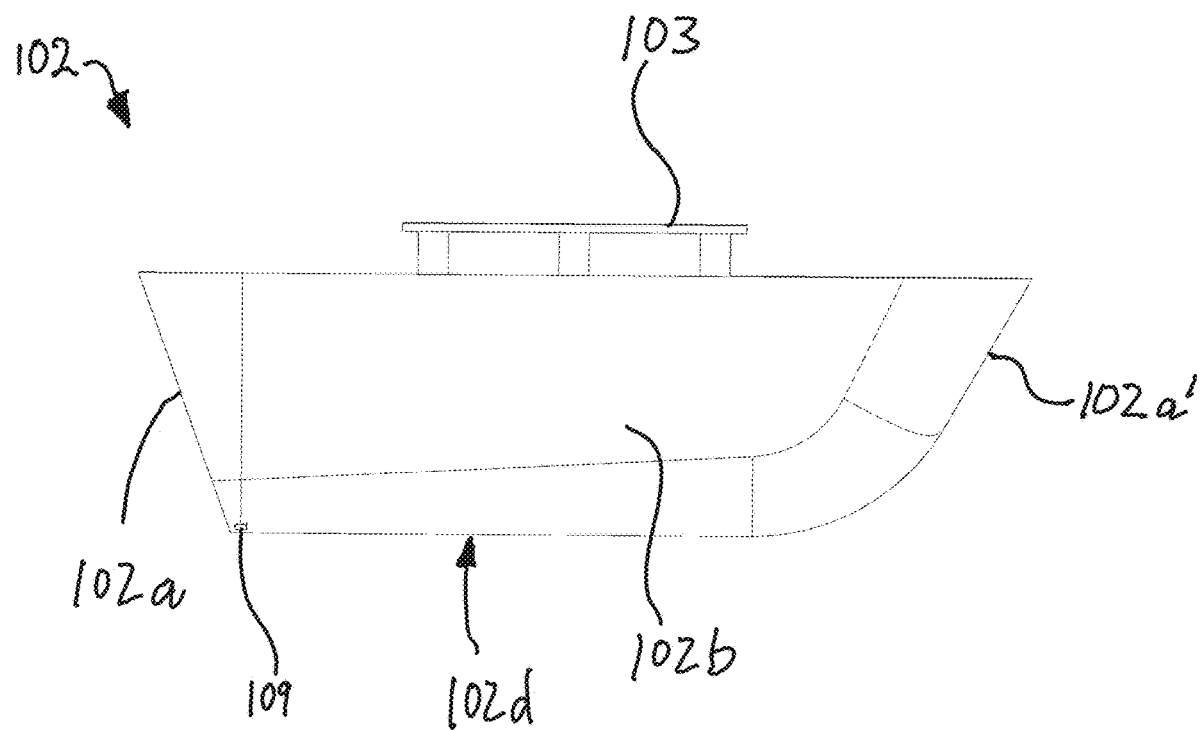
FIG. 23 shows a side view of the cargo cradle of FIG. 21.
Figure 24:
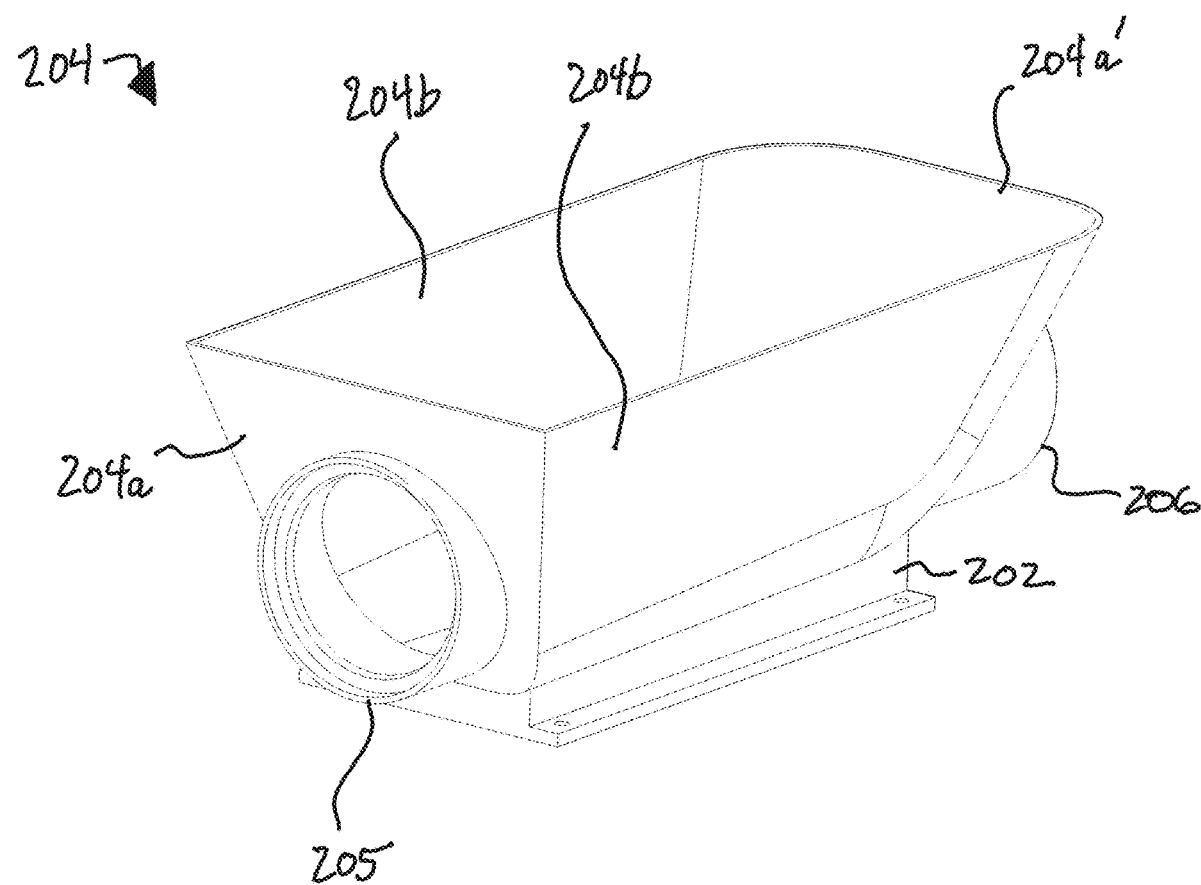
FIG. 24 shows a perspective view of a loading dock consistent with one embodiment of the present disclosure that is suitable for use in a system configured to enable convenient automatic or semi-automatic loading and unloading of payload from a UAS.
Figure 25:
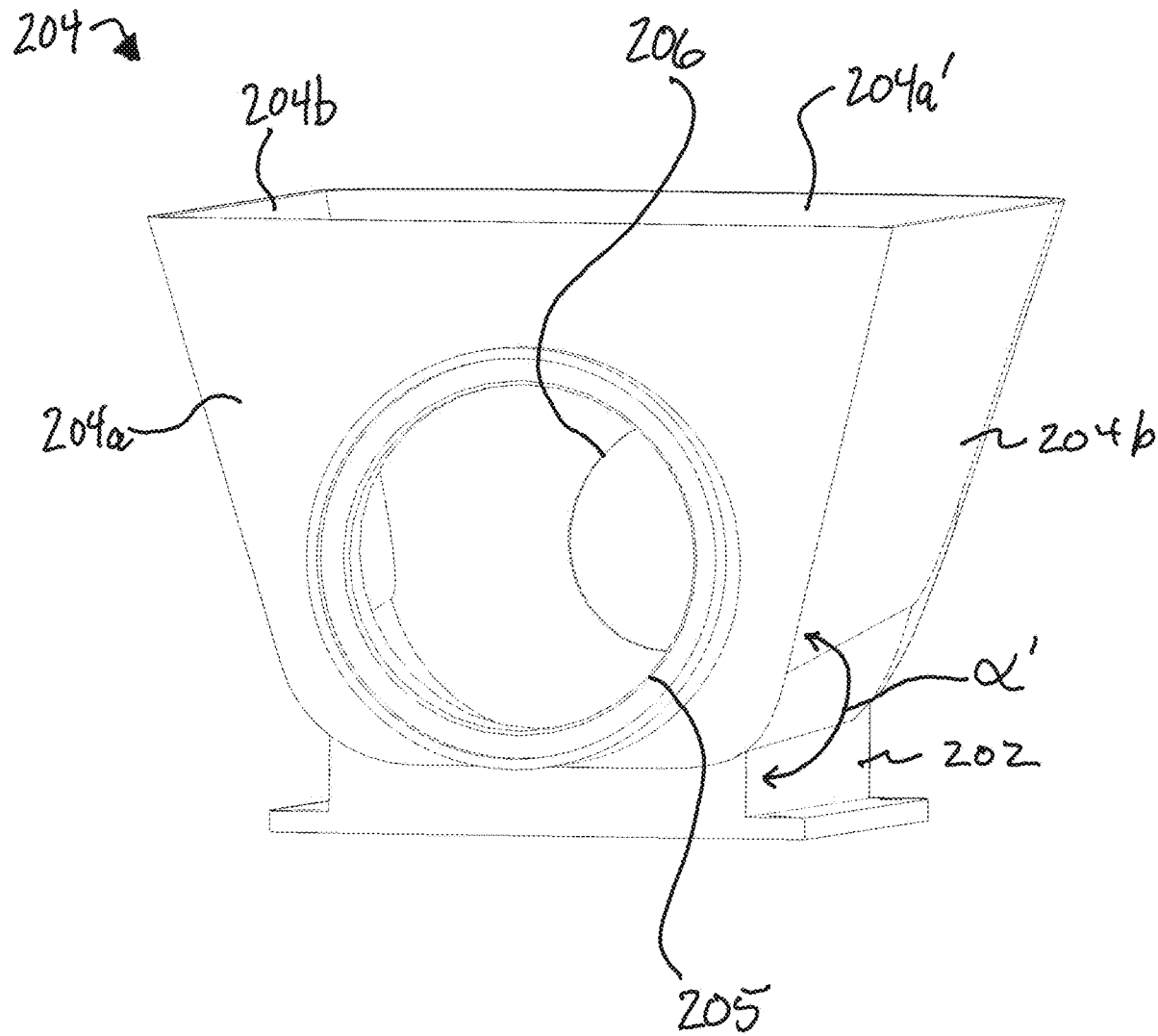
FIG. 25 shows a front perspective view of the loading dock of FIG. 24.
Figure 26:
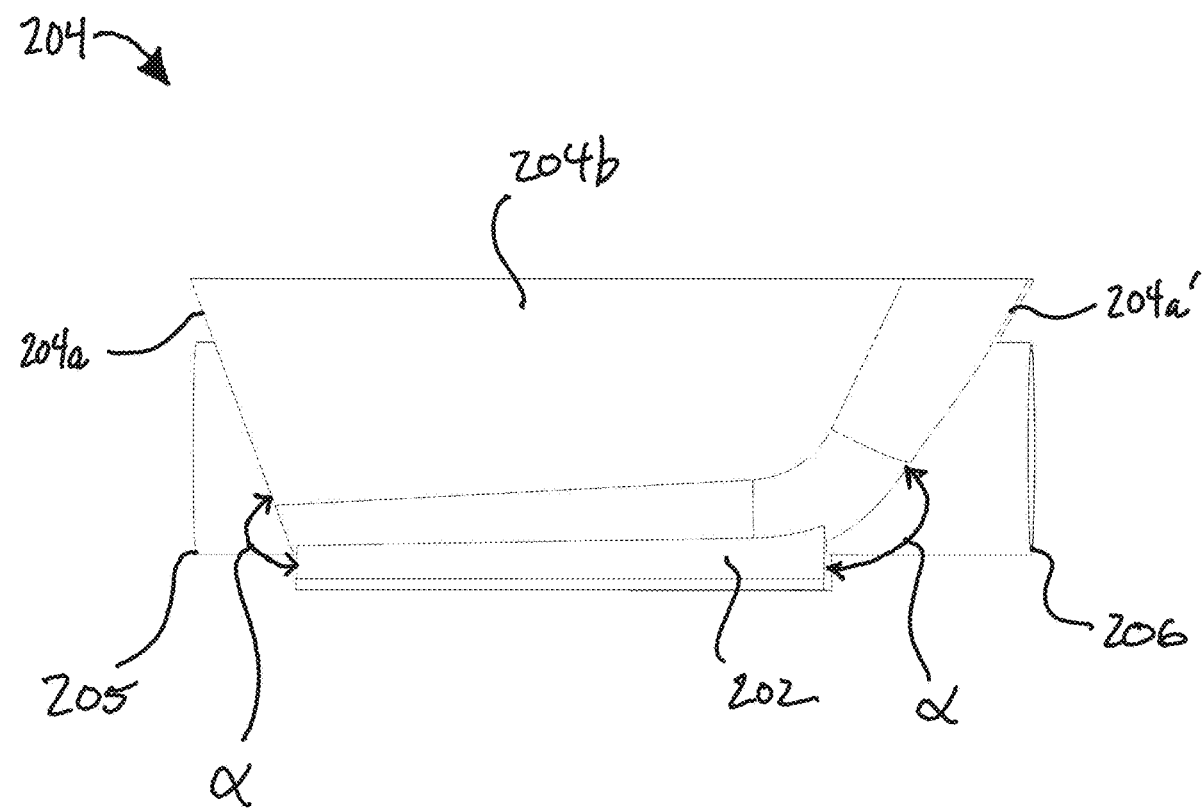
FIG. 26 shows a side view of the loading dock of FIG. 24.
Figure 27:
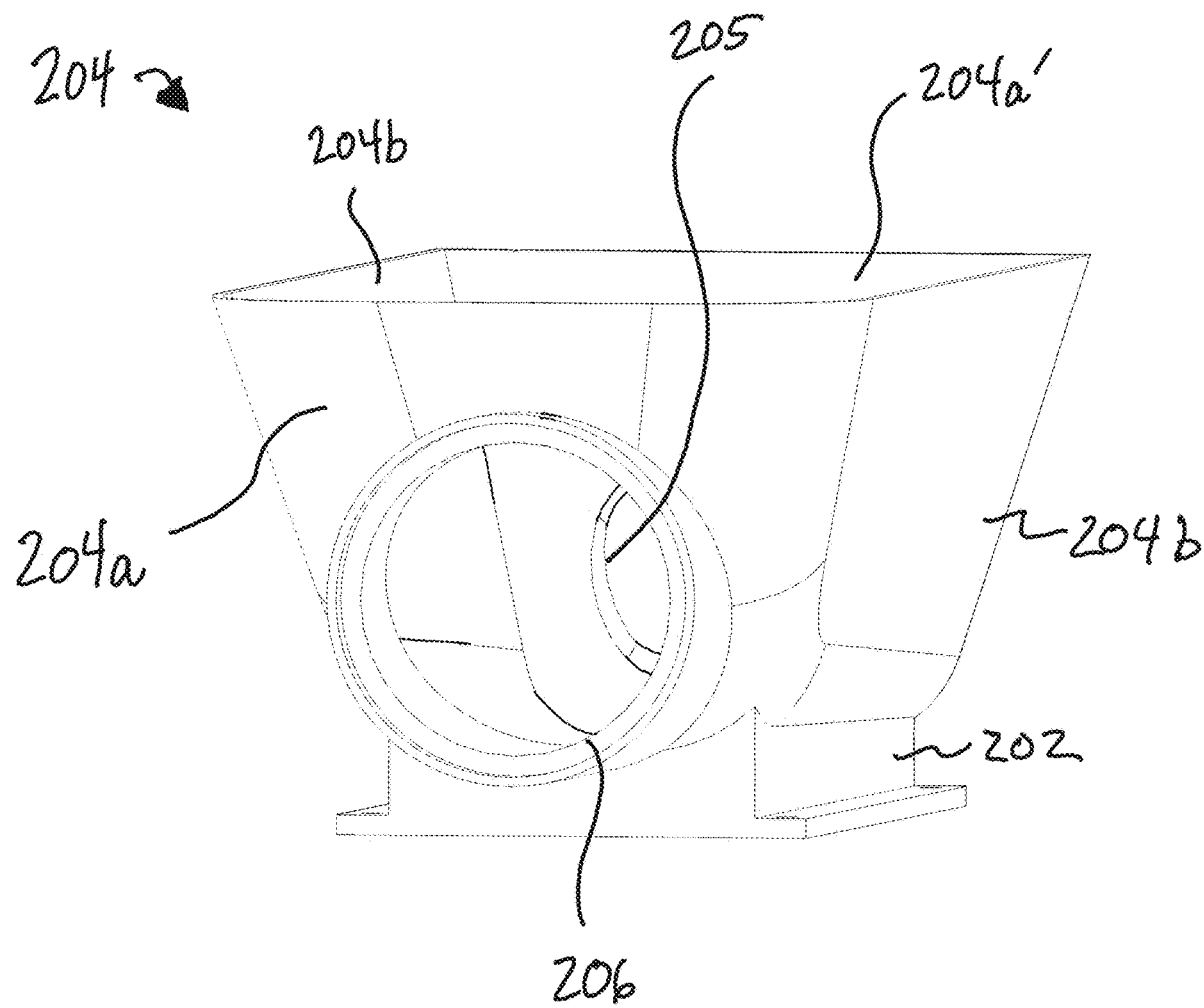
FIG. 27 shows a rear view of the loading dock of FIG. 24.
Figure 28:
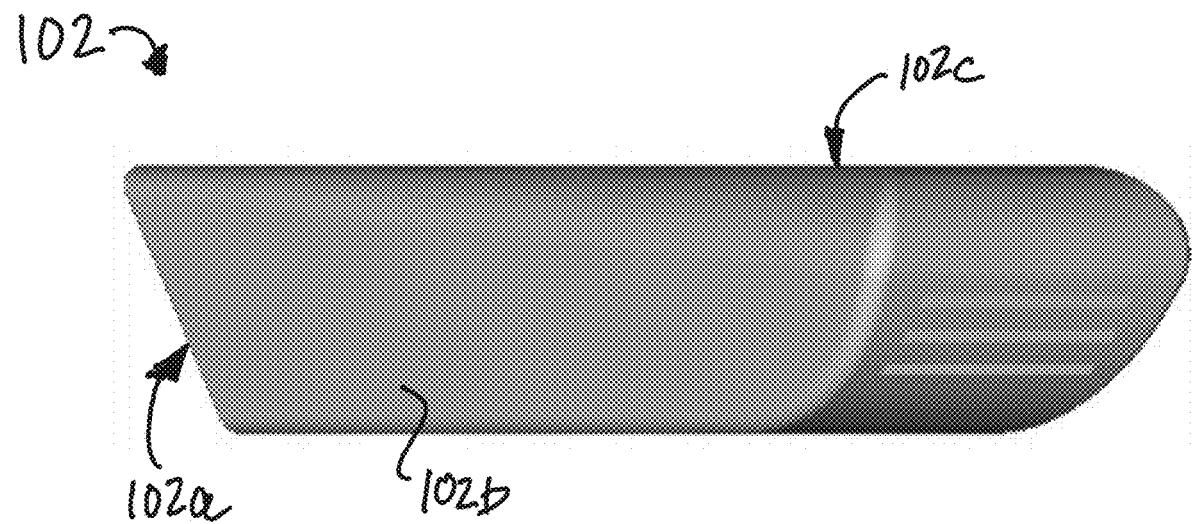
FIG. 28 shows a perspective view of a cargo cradle component consistent with one embodiment of the present disclosure that is suitable for use with a UAS.
Figure 29:
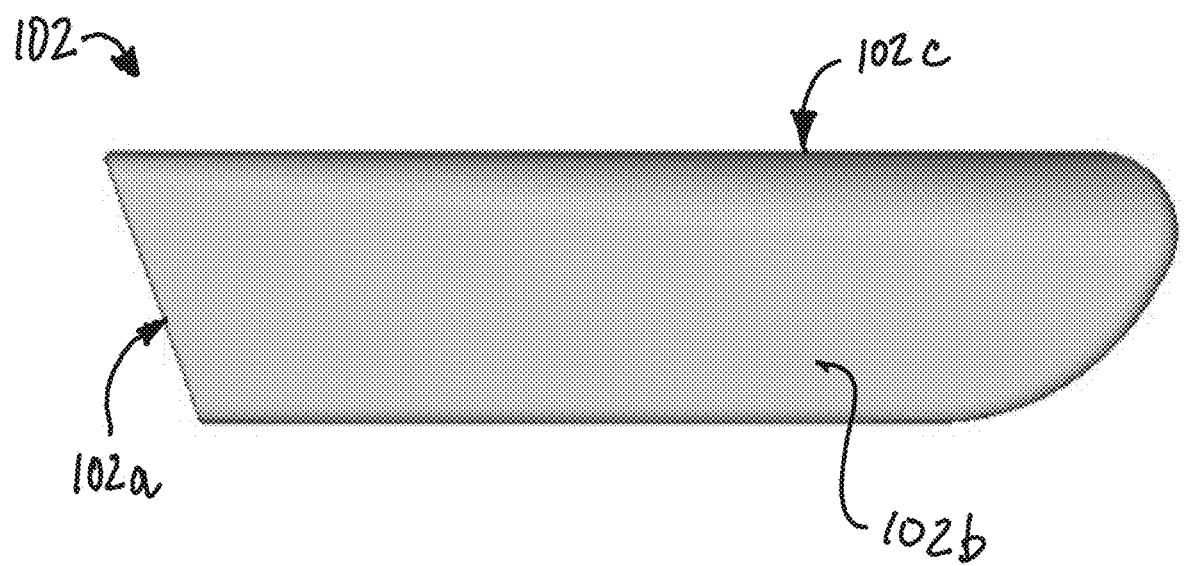
FIG. 29 shows a right side view of the cargo cradle of FIG. 28, of which the left side view is a substantial mirror image.
Figure 30:
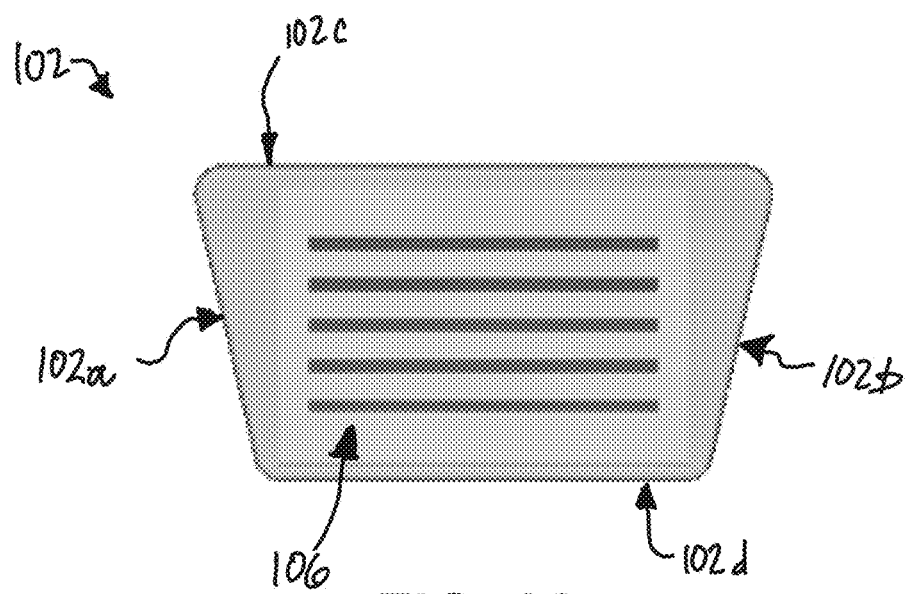
FIG. 30 shows a rear view of the cargo cradle of FIG. 28.
Figure 31:
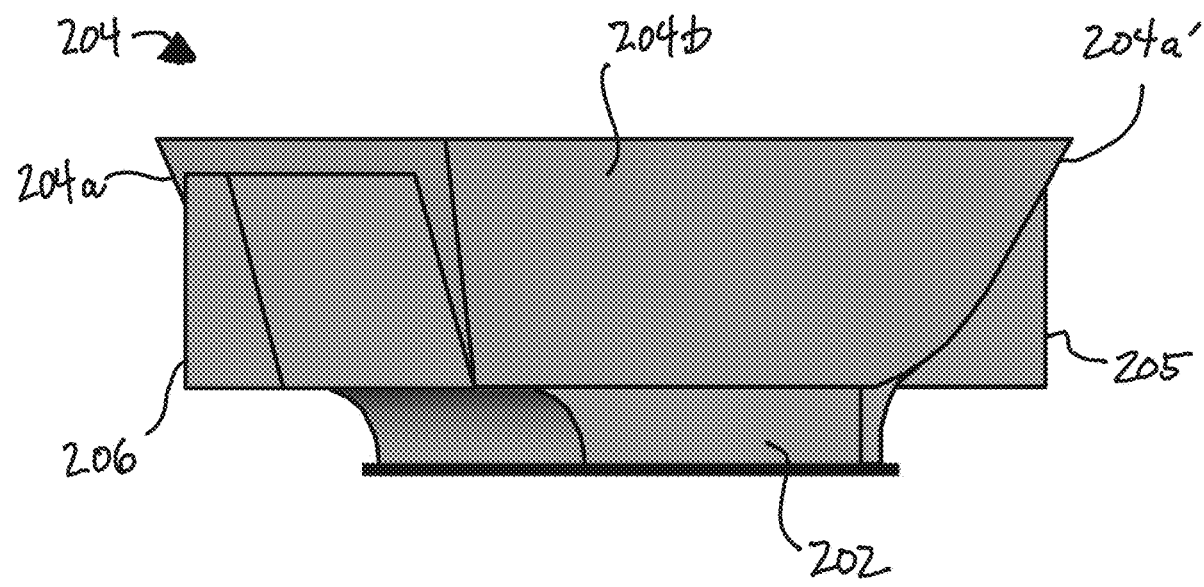
FIG. 31 shows a perspective view of a loading dock consistent with one embodiment of the present disclosure that is suitable for use in a system configured to enable convenient automatic or semi-automatic loading and unloading of payload from a UAS equipped with the cargo cradle of FIG. 28.
Figure 32:
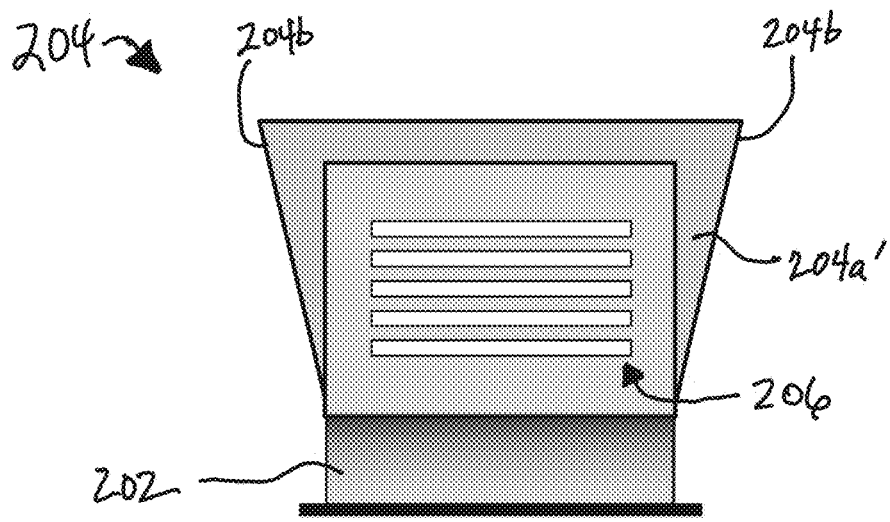
FIG. 32 shows a right side view of the loading dock of FIG. 31, of which the left side view is a substantial mirror image.
Figure 33:
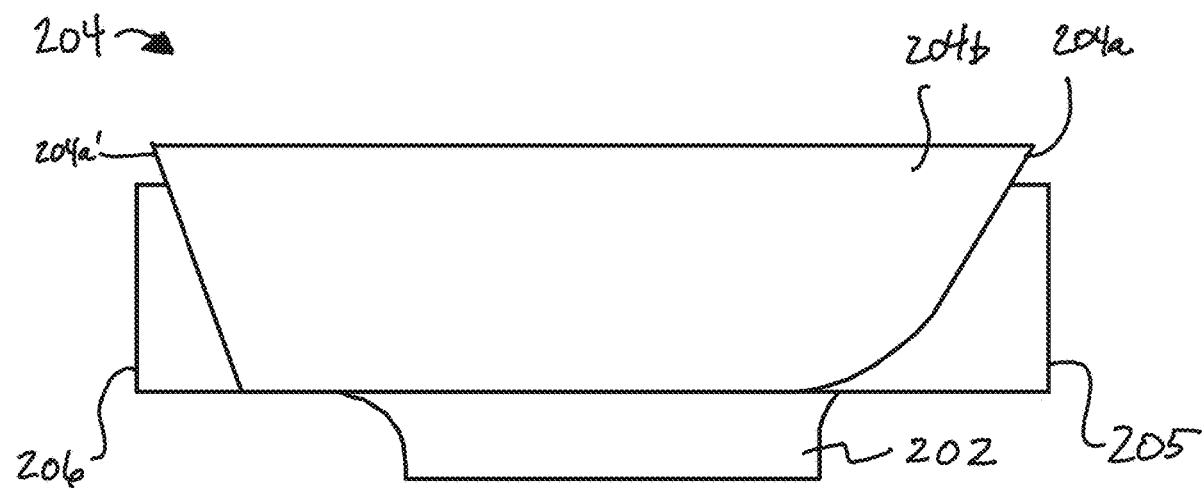
FIG. 33 shows a rear view of the loading dock of FIG. 31.
Figure 34:
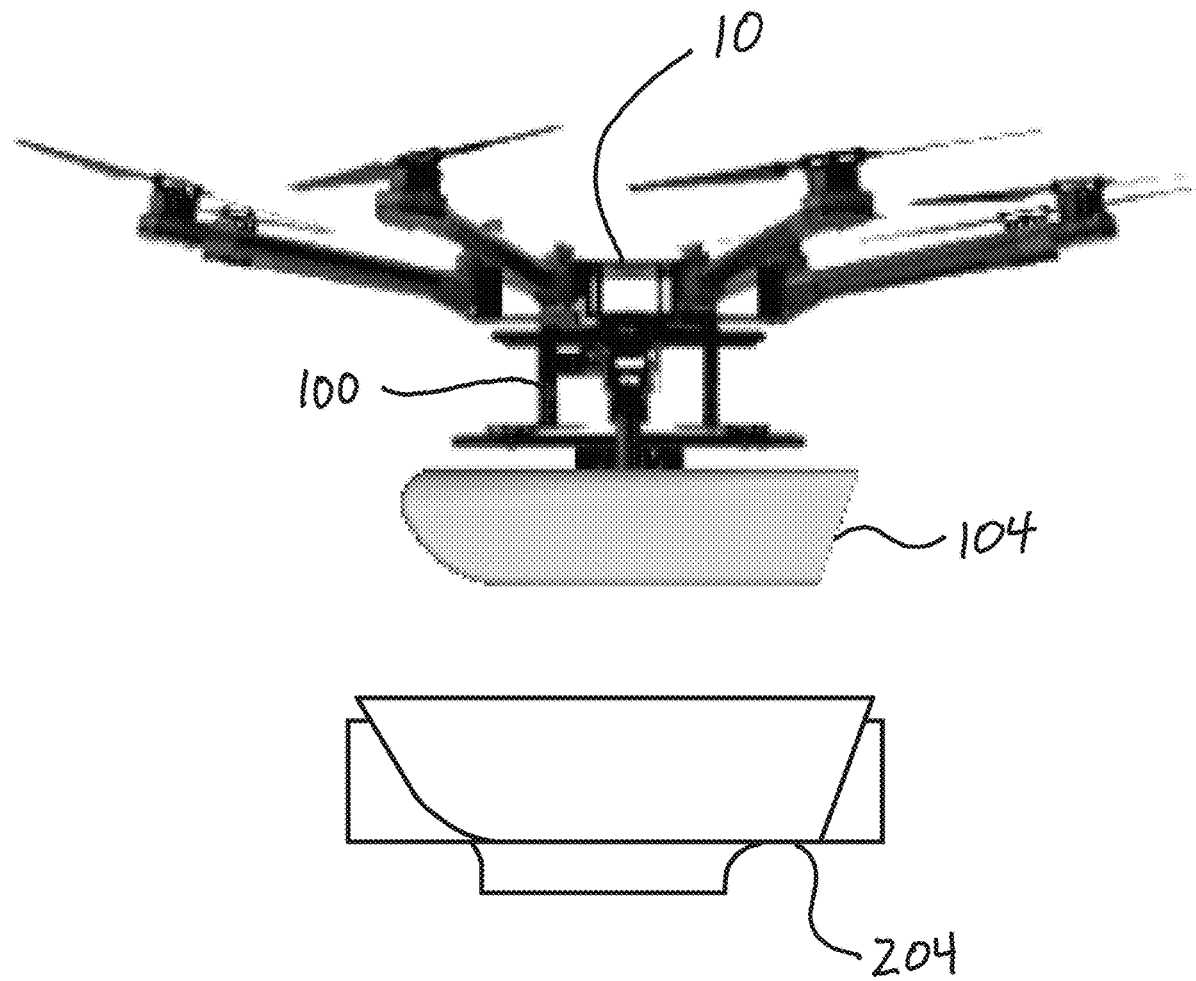
FIG. 34 shows a UAS equipped with the cargo cradle of FIG. 28 in substantial alignment with the loading dock of FIG. 31.
Figure 35:
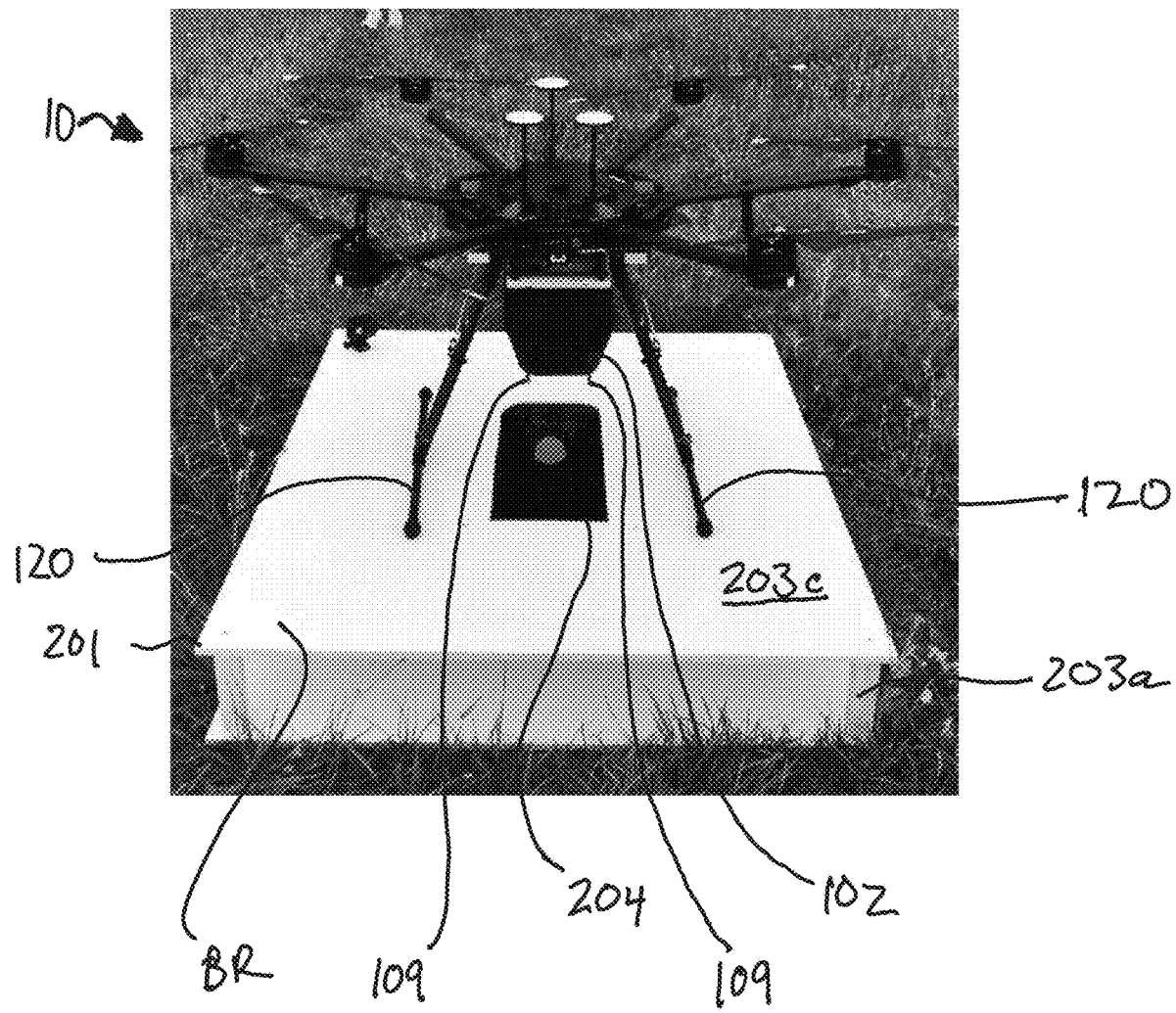
FIG. 35 shows a front photographic view of a UAS consistent with the present disclosure including the cargo cradle of FIG. 21 positioned over a section of building roof in which the loading dock of FIG. 24 has been incorporated.
Figure 36:
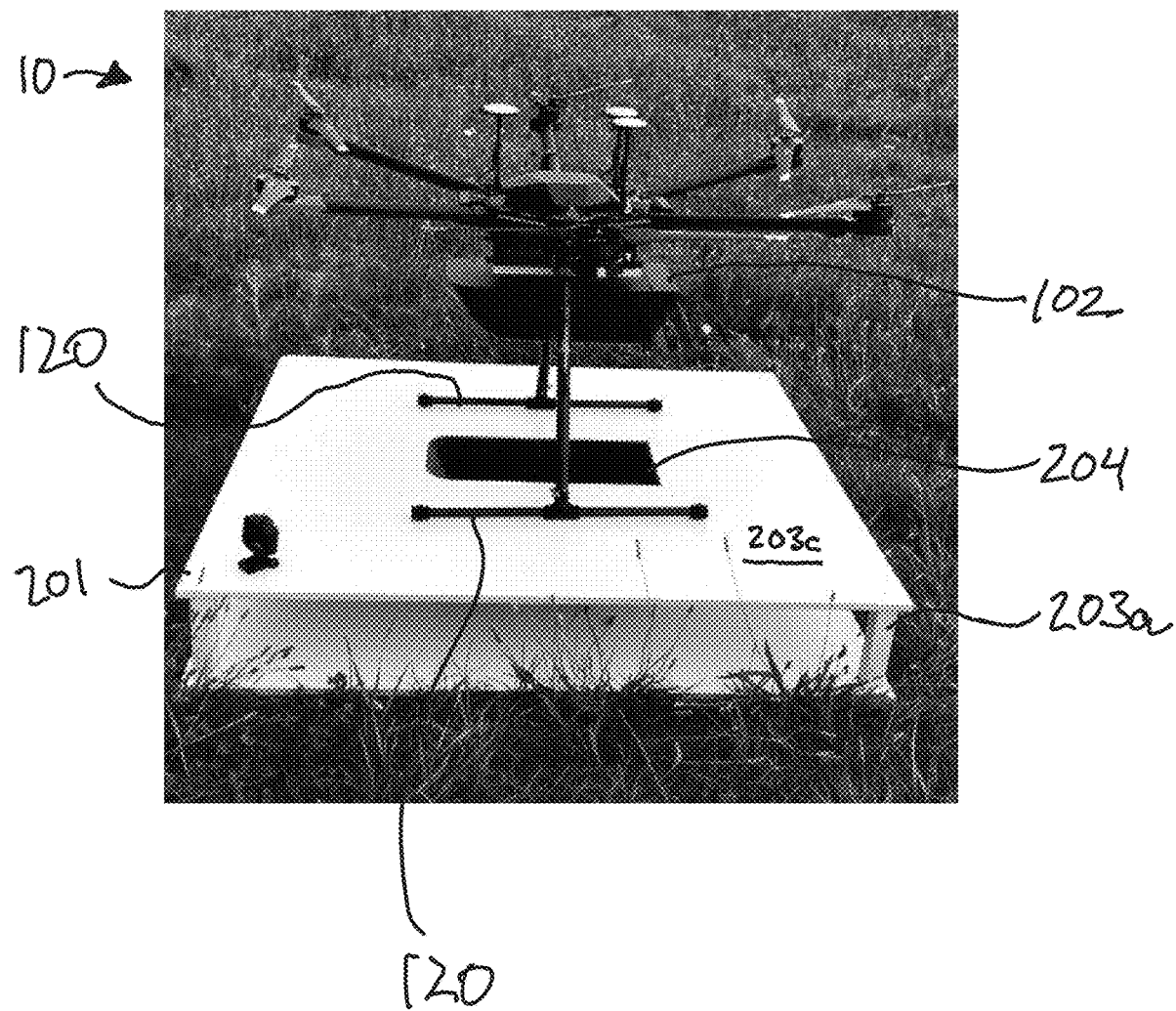
FIG. 36 shows a side photographic view of the UAS and loading dock of FIG. 35.
Figure 37:
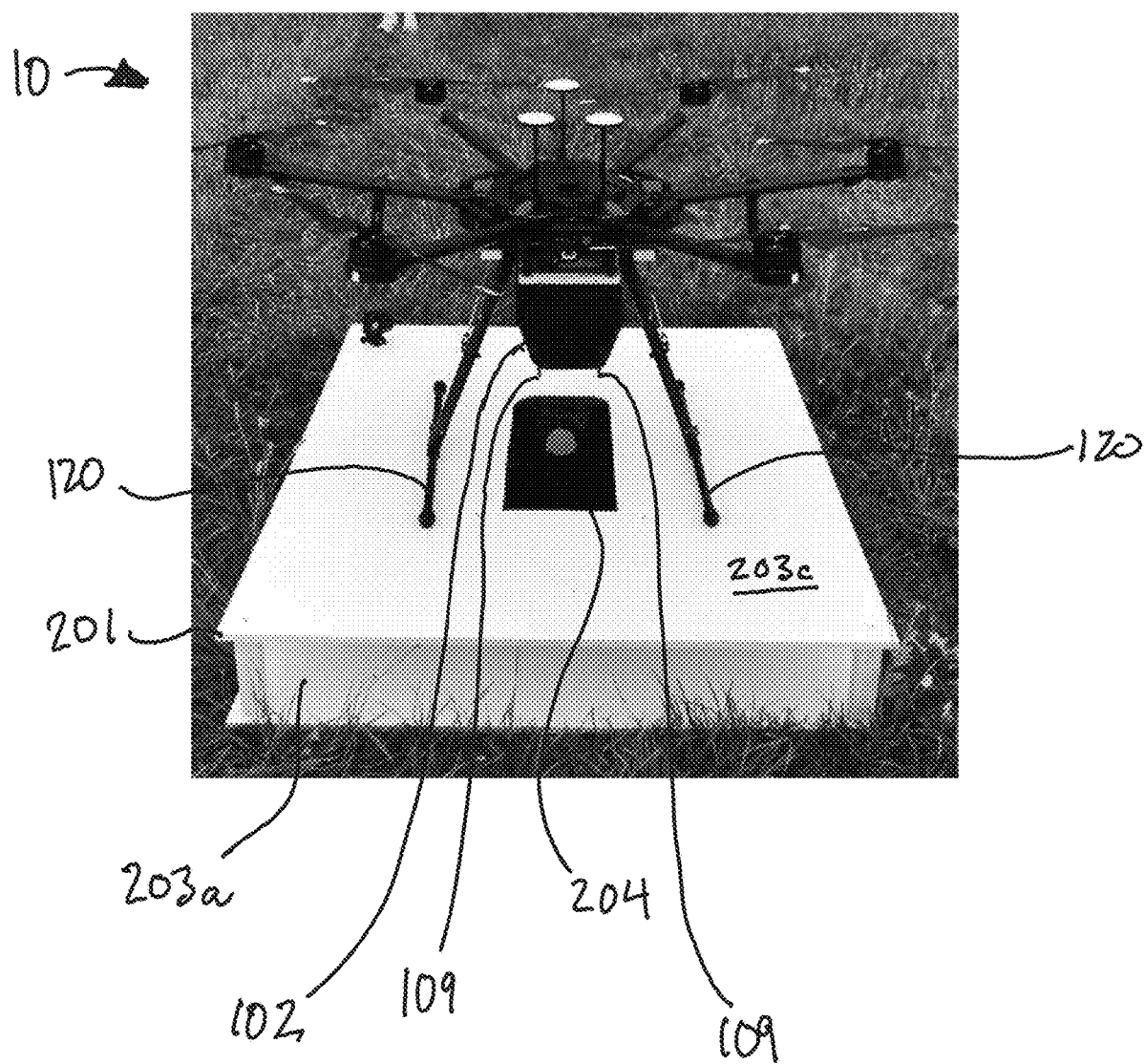
FIG. 37 shows a rear photographic view of the UAS and loading dock of FIG. 35.

Referring now specifically to FIGS. 21-23, the cargo cradle 102 may include a mounting bracket 103 configured to enable convenient coupling of the cargo cradle 102 to a UAS 10. In some embodiments, the mounting bracket 103 is disposed on a top surface 102c of the cargo cradle 102.

The cargo cradle 102 may be coupled to the body portion 100 of a drone such that removal of the cargo cradle 102 is discouraged, inefficient, destructive to the drone and/or the payload 30, or made virtually impossible (e.g., by integrally forming the body portion 100 and the cargo cradle 102 from a unitary piece of material). In other embodiments, the cargo cradle 102 may be readily removed from the body portion 100, for example without the need for tools or removal of any fasteners. Removable and replaceable cargo cradles 102 may offer several advantages over cargo cradles 102 that are difficult or destructive to remove. For example and without limitation, removable and replaceable cargo cradles 102 may offer the owner or operator of the UAS 10 opportunities to economically transport payload 30 of different shapes and sizes using a single drone.

In some embodiments, the opening 105 of the cargo cradle 102 may include or be selectively closed by a door or gate 107. In such embodiments, the door or gate 107 may be configured to open when (e.g., only when) the cargo cradle 102 is coupled with a loading dock 200. For example and without limitation, the gate 107 in some embodiments may be configured to open when one or more gate activators 109 are activated. For example and without limitation, in one embodiment one, two, or more than two gate activators 109 extend downwardly from the bottom surface 102d of the cargo cradle 102. In such embodiments, the one, two, or more than two gate activators 109 are configured to retract into the cargo cradle 102 when the cargo cradle 102 mates with the dock 200 (e.g., due to the weight of the UAS 10 resting on the loading dock 200). The retraction of the one, two, or more than two gate activators 109 cause (e.g., mechanically cause) the door or gate 107 to open. Optionally, the door or gate 107 is configured to close when the one, two, or more than two gate activators 109 return to their extended configuration, for example when the UAS 10 unmates the cargo cradle 102 from the loading dock 200.

In some embodiments, the one or more gate activators 109 comprise an electronic sensor configured to provide a signal to an associated processor that the cargo cradle 102 is mated with a loading dock 200. The electronic sensor 109 may be, for example and without limitation, a proximity sensor such as a magnet that changes a polarity or electrical current in an associated electronic sensor disposed in the loading dock basket 204 (not shown). The door or gate 107 may include a solenoid configured to remain in an extended position to maintain the door or gate 107 in a closed state until the electronic sensor 109 senses that the cargo cradle 102 is mated with a loading dock basket 204. When electronic sensor gate activator(s) 109 are present, the door or gate 107 may be configured to remain in a closed configuration until the electronic sensor gate activator 109 indicates that the cargo cradle 102 is mated with a loading dock basket 204 or with an unlocking device (not shown) that enables an authorized user to unlock a cargo cradle 102 in order to insert or remove payload 30 from the payload hold area 104.

In some embodiments, the cargo cradle 102 is asymmetrically shaped. One advantage of such a configuration is to prevent the cargo cradle 102 from coupling with the loading dock 200 in an orientation that prevents the cargo from transferring from the associated ducts 210 to the payload hold area 104 (or vice versa). Another advantage of such a configuration is to enable the first opening 105 of the cargo cradle 102 to more consistently and automatically align with the first opening 205 of the loading dock 200. Referring specifically to the embodiment shown representatively in FIGS. 21-23, for example, a cargo cradle 102 may be symmetrical in one dimension (e.g., laterally) but asymmetrical in another dimension (e.g., longitudinally). For example and without limitation, the outer contour of the front side 102a may feature a different shape than the outer contour of the rear side 102a'. In the same embodiment, for example, the lateral side walls 102b may have the same outer contour shape.

In some embodiments, the present disclosure provides an unmanned aircraft system 10 comprising: a body portion 100; optionally at least one propeller 110 disposed above the body portion; and a cargo cradle 102 disposed generally below the body portion and comprising: a plurality of sides 102a, 102b that, together, form a wedge-shaped shell, a first opening 105 disposed through the wedge-shaped shell and configured to enable a payload 30 to pass therethrough, and a second opening 106 disposed through the wedge-shaped shell and configured to enable air but not the payload 30 to pass therethrough. In some embodiments, the cargo cradle 102 further includes a base 102d at a bottom end and a top 102c opposite the base, wherein the base has a width less than a width of the top. In some embodiments, the first opening 105 is generally circular or oval. In some embodiments, the UAS 10 further comprises a payload hold area 104 disposed within the wedge-shaped shell. In some embodiments, the payload hold area 104 has a generally tubular shape. In some embodiments, at least one side 102a extends from the base 102d at a first angle $\delta$, and wherein at least one side 102b extends from the base 102d at a second, different angle $\delta'$. In some embodiments, the first angle $\delta$ and the second angle $\delta'$ are both obtuse.

In some embodiments, the present disclosure provides a cargo cradle 102 for delivering payload 30 by UAS, the cargo cradle 102 comprising: a shell including side walls 102a; a payload hold area 104 disposed within the shell and configured to receive payload 30 therein; a first opening 105 in a first side wall 102a and in operative communication with the payload hold area 104, wherein the first opening is sized and shaped to enable the payload 30 to pass therethrough; and a second opening 106 in a second side wall 102a and in operative communication with the payload hold area 104, wherein the second opening is configured to enable air but not the payload to pass therethrough. In some embodiments, the shell is sized and shaped such that the side walls 102a contact all or substantially all interior surfaces of side walls of a basket 204 of a loading dock 200 when the UAS 10 is docked with the loading dock. In some embodiments, the shell has an inverted truncated pyramidal shape. In some embodiments, the side wall 102a extends upward from a base 102d of the shell at an angle $\delta$. In some embodiments, the angle $\delta$ is obtuse. In some embodiments, the shell has an inverted truncated pyramidal shape. In some embodiments, the inverted truncated pyramidal shape is an inverted truncated rectangular pyramid. In some embodiments, the inverted truncated pyramidal shape is not an inverted truncated square pyramid. In some embodiments, the payload hold area 104 has a tubular shape. In some embodiments, the tubular shape is a circular tube. In some embodiments, the cargo cradle 102 is configured to be coupled with a UAS.

2. Loading Docks and Loading Systems

The present disclosure provides loading docks 200 and loading systems 20 including one or more loading docks 200.

Referring now generally to FIGS. 4-6, 24-27, and 31-32, loading docks 200 consistent with the present disclosure include a basket portion 204 with which the cargo cradle 102 of a UAS 10 is coupled. The basket 204 may include a plurality of walls 204a, 204b that define the interior space of the basket 204. Generally, the walls 204a, 204b are disposed relative to each other and sized and shaped to complement the outer shape of the cargo cradle 102 of the UAS 10. In some embodiments, the walls 204a, 204b complement the outer shape of the cargo cradle 102 of an associated UAS 10 such that, when the cargo cradle 102 couples with the interior space of the basket 204, the opening 105 of the cargo cradle 102 is in close proximity (e.g., immediately adjacent to, in pneumatic communication with, or in contact with) the opening 205 of the basket 204. In some embodiments, the walls 204a, 204b complement the outer shape of the cargo cradle 102 of an associated UAS 10 such that, when the cargo cradle 102 couples with the interior space of the basket 204, the opening 106 of the cargo cradle 102 is in close proximity (e.g., immediately adjacent to, in pneumatic communication with, or in contact with) the opening 206 of the basket 204. In some embodiments, the walls 204a, 204b complement the outer shape of the cargo cradle 102 of an associated UAS 10 such that, when the cargo cradle 102 couples with the interior space of the basket 204, the opening 105 of the cargo cradle 102 is in close proximity (e.g., immediately adjacent to, in pneumatic communication with, or in contact with) the opening 205 of the basket 204 and the opening 106 of the cargo cradle 102 is in close proximity (e.g., immediately adjacent to, in pneumatic communication with, or in contact with) the opening 206 of the basket 204.

In some embodiments, the basket 204 has a general wedge shape, such as an inverted truncated pyramidal shape. In some embodiments, the inverted truncated pyramidal shape is an inverted truncated rectangular pyramid. In some embodiments, the inverted truncated pyramidal shape is not an inverted truncated square pyramid. Baskets 204 having an inverted truncated pyramidal shape where the base is not a regular polygon may be advantageous in that inverted truncated pyramidal shaped baskets 204 where the geometrical base is not a regular polygon has fewer proper potential coupling orientations with a cargo cradle 102. Nonetheless, in some embodiments the inverted truncated pyramid may have a geometrical base that is a regular polygon (e.g., a square, a regular pentagon, a regular hexagon, a regular heptagon, a regular octagon, etc.).

The basket 204 may include at least one side wall 204a extending from the side wall 202a of a base portion 202 at an angle α. In some embodiments, the angle α is obtuse (e.g., about 90° to about 180°), for example about 90° to about 180°, about 91° to about 179°, about 100° to about 170°, about 105° to about 165°, about 110° to about 160°, about 115° to about 155°, about 120° to about 150°, about 125° to about 145°, or about 130° to about 140°. In some embodiments the angle α is selected from the group consisting of: about 90°, about 91°, about 92°, about 93°, about 94°, about 95°, about 96°, about 97°, about 98°, about 99°, about 100°, about 101°, about 102°, about 103°, about 104°, about 105°, about 106°, about 107°, about 108°, about 109°, about 110°, about 111°, about 112°, about 113°, about 114°, about 115°, about 116°, about 117°, about 118°, about 119°, about 120°, about 121°, about 122°, about 123°, about 124°, about 125°, about 126°, about 127°, about 128°, about 129°, about 130°, about 131°, about 132°, about 133°, about 134°, about 135°, about 136°, about 137°, about 138°, about 139°, about 140°, about 141°, about 142°, about 143°, about 144°, about 145°, about 146°, about 147°, about 148°, about 149°, about 150°, about 151°, about 152°, about 153°, about 154°, about 155°, about 156°, about 157°, about 158°, about 159°, about 160°, about 161°, about 162°, about 163°, about 164°, about 165°, about 166°, about 167°, about 168°, about 19°, about 170°, about 171°, about 172°, about 173°, about 174°, about 175°, about 176°, about 177°, about 178°, about 179°, or about 180°.

In some embodiments, for example when the shape of the basket 204 is not an inverted truncated regular pyramid shape, a second wall 204b may extend from the side wall 202a of a base portion 202 at a second angle α' that is different from the angle α. In some embodiments, the second angle α' is obtuse (e.g., about 90° to about 180°), for example about 90° to about 180°, about 91° to about 179°, about 100° to about 170°, about 105° to about 165°, about 110° to about 160°, about 115° to about 155°, about 120° to about 150°, about 125° to about 145°, or about 130° to about 140°. In some embodiments the second angle α' is selected from the group consisting of: about 90°, about 91°, about 92°, about 93°, about 94°, about 95°, about 96°, about 97°, about 98°, about 99°, about 100°, about 101°, about 102°, about 103°, about 104°, about 105°, about 106°, about 107°, about 108°, about 109°, about 110°, about 111°, about 112°, about 113°, about 114°, about 115°, about 116°, about 117°, about 118°, about 119°, about 120°, about 121°, about 122°, about 123°, about 124°, about 125°, about 126°, about 127°, about 128°, about 129°, about 130°, about 131°, about 132°, about 133°, about 134°, about 135°, about 136°, about 137°, about 138°, about 139°, about 140°, about 141°, about 142°, about 143°, about 144°, about 145°, about 146°, about 147°, about 148°, about 149°, about 150°, about 151°, about 152°, about 153°, about 154°, about 155°, about 156°, about 157°, about 158°, about 159°, about 160°, about 161°, about 162°, about 163°, about 164°, about 165°, about 166°, about 167°, about 168°, about 19°, about 170°, about 171°, about 172°, about 173°, about 174°, about 175°, about 176°, about 177°, about 178°, about 179°, or about 180°.

One side wall 204a may include an opening 205 configured to enable the payload 30 to pass therethrough and into the payload hold area 104 of a coupled UAS 10. The opening 205 may have a size and shape similar to, slightly larger than, or slightly smaller than the opening 105 in the cargo cradle 102 of the coupled UAS 10. The shape of the opening 205 may complement the cross-sectional shape of an associated conveyor duct 210 of the loading system 20.

A second side wall 204a, 204b may include a second opening 206 configured to enable air to readily pass therethrough, and configured to not enable the payload 30 to pass therethrough. For example and without limitation, the second opening 206 may have a smaller size, a different shape, a barrier (e.g., a screen), or any combination of the foregoing compared to the first opening 205 to prevent the payload 30 from exiting through the second opening 206 but while enabling air to pass easily through the second opening 206.

In some embodiments, one or more guidance flaps 208 extend upwards from one or more side walls 204a, 204b of the basket 204 at an angle β. The guidance flaps 208 may provide additional coupling guidance for a UAS 10 as it descends towards the loading dock 200. When present the guidance flap(s) 208 may extend from the side wall(s) 204a, 204b at an angle β that is about 95° to about 180°, about 115° to about 170°, or about 125° to about 160°, for example about 95°, about 96°, about 97°, about 98°, about 99°, about 100°, about 101°, about 102°, about 103°, about 104°, about 105°, about 106°, about 107°, about 108°, about 109°, about 110°, about 111°, about 112°, about 113°, about 114°, about 115°, about 116°, about 117°, about 118°, about 119°, about 120°, about 121°, about 122°, about 123°, about 124°, about 125°, about 126°, about 127°, about 128°, about 129°, about 130°, about 131°, about 132°, about 133°, about 134°, about 135°, about 136°, about 137°, about 138°, about 139°, about 140°, about 141°, about 142°, about 143°, about 144°, about 145°, about 146°, about 147°, about 148°, about 149°, about 150°, about 151°, about 152°, about 153°, about 154°, about 155°, about 156°, about 157°, about 158°, about 159°, about 160°, about 161°, about 162°, about 163°, about 164°, about 165°, about 166°, about 167°, about 168°, about 169°, about 170°, about 171°, about 172°, about 173°, about 174°, about 175°, about 176°, about 177°, about 178°, about 179°, or about 180°.

In other embodiments, such as those generally consistent with the representative embodiment shown in FIGS. 17-20, at least a portion of the basket 204 has a rounded shape. For example and without limitation, the basket 204 may include a generally cup-shaped portion defined by side wall(s) 204a, 204b. The cupped portion of the basket 204 may include any suitable curved contour(s) configured to couple with the bottom portion of a corresponding cargo cradle 102. The curved contour(s) may be spherical, oval, parabolic, a truncated portion of any of the foregoing, or any combination thereof. In some embodiments, the cargo cradle 102 has a spherical or hemispherical or truncated spherical shape. In some embodiments, the cargo cradle 102 has an oval shape or a semi-oval shape. In other embodiments, the cargo cradle 102 has an almond (e.g., vesica piscis) shape or a semi-almond shape.

Referring now to FIGS. 24-27, the basket 204 may feature an asymmetrical shape. One advantage of such a configuration is to prevent the cargo cradle 102 from coupling with the basket 204 in an orientation that prevents the cargo from transferring from the associated ducts 210 to the payload hold area 104 (or vice versa). Referring specifically to the embodiment shown representatively in FIGS. 24-27, for example, a basket 204 may be symmetrical in one dimension (e.g., laterally) but asymmetrical in another dimension (e.g., longitudinally). For example and without limitation, the outer contour of the front side 204a may feature a different shape than the outer contour of the rear side 204a'. In the same embodiment, for example, the lateral side walls 204b may have the same outer contour shape.

Referring now to FIGS. 7-16, loading systems 20 of the present disclosure additionally include a pneumatic duct network 210 in operative communication with one or more air blowers or vacuum pumps 230 and the one or more loading docks 200. As shown in FIGS. 7-16, the basket 204 of the loading dock 200 may be disposed above the surface of the building roof BR, and the building roof BR may act as a landing pad onto which one or more landing support(s) 120 may rest. In other embodiments, such as those shown representatively in FIGS. 34-39, the basket 204 may be disposed below the top surface of a landing pad 201; one advantage of such embodiments is to enable the UAS 10 to skim the surface of the building roof BR (e.g., landing pad) until the cargo cradle 102 falls into the basket 204.

Figure 38:
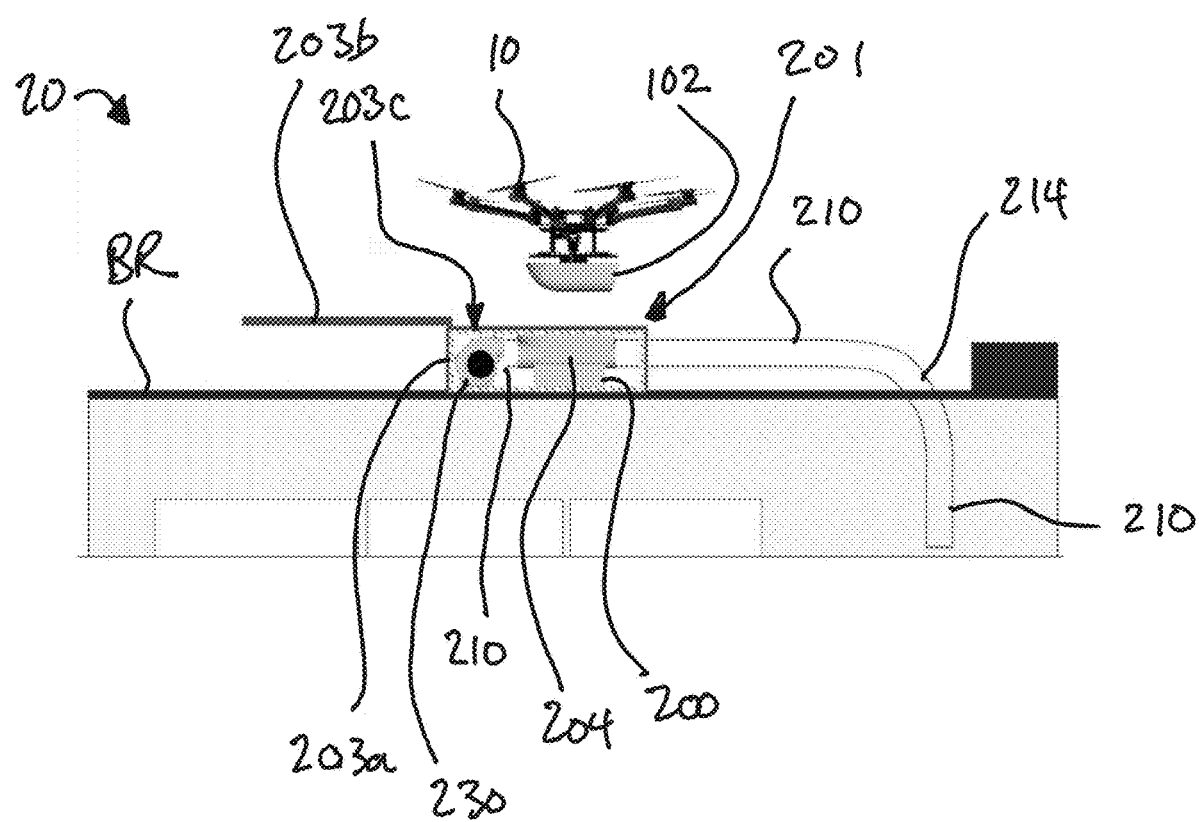
FIG. 38 shows a schematic representative view of a loading system consistent with one embodiment of the present disclosure, including a UAS approaching a loading dock associated with the loading system.
Figure 39:
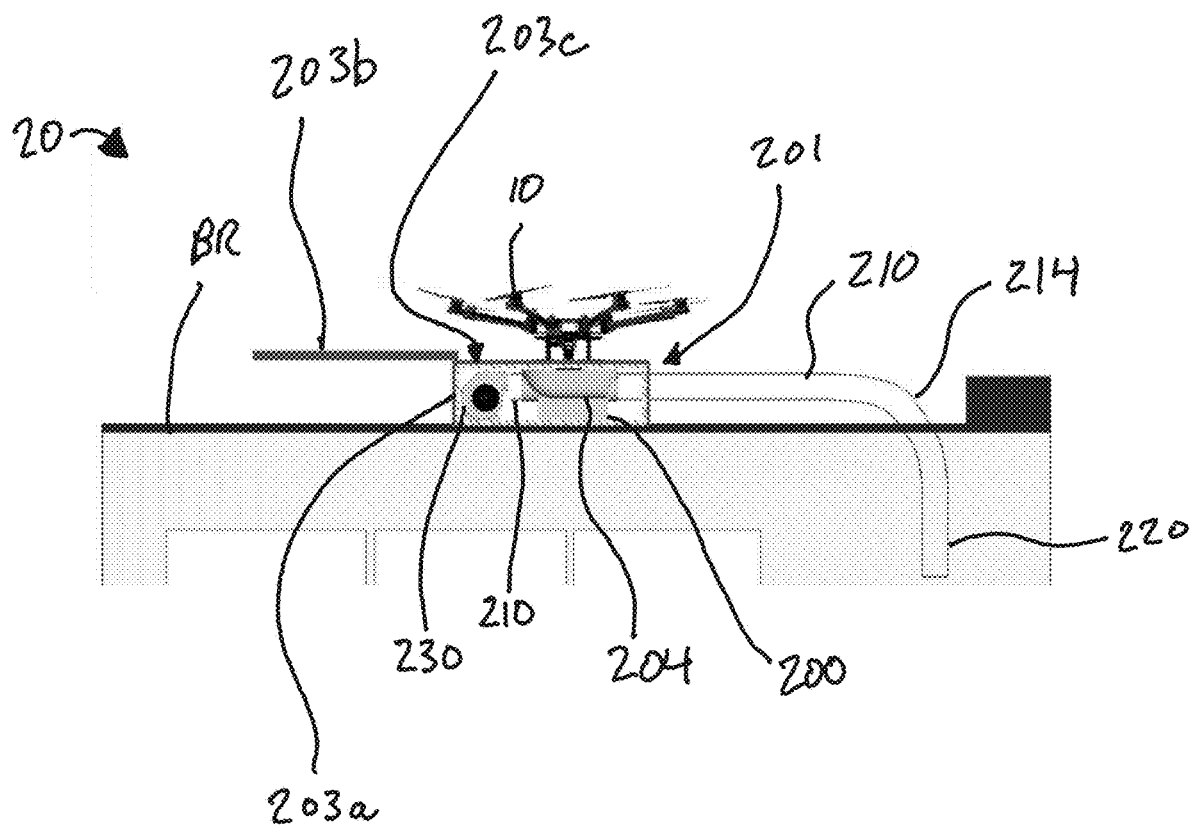
FIG. 39 shows a schematic representative view of the loading system of FIG. 38 with the UAS mated with the loading dock.

Referring now specifically to FIGS. 38-39, the system 20 in some embodiments includes a landing pad 201 comprising a box 203a defining an inner cavity, and a removable lid 203b configured to selectively provide or restrict access to the inner cavity. The landing pad 201 may include an upper surface 203c that is about even with, higher than, or lower than the top surface of the basket 204 housed within the inner cavity. In some embodiments, the upper surface 203c is higher than the surface of the building roof BR. In some embodiments, at least one blower 230 is housed within the inner cavity and is in pneumatic communication with one or more ducts 210 and the loading dock 200.

In some embodiments, the pneumatic duct network 210 includes one or more bends or curves 214 in the ducts 210. The inclusion of bends 214 in the duct network 210 enables convenient installation of portions of the loading system 20 exterior to a building B (e.g., on the roof BR) and other portions of the loading system 20 interior to a building B. For example and without limitation, a loading system 20 may be associated with a building B such that the loading dock(s) 200 are exterior to the building B and therefore easily accessible to a UAS 10, while a packing area 220 may be disposed interior to the building B and therefore conveniently accessible to human users, warehouse space, sorting equipment, or other delivery management systems as needed.

In some embodiments, the loading system 20 includes one or more counter-blowers (not shown) configured to force air through the pneumatic duct network 210 against the flow of the one or more air blowers or vacuum pumps 230. In such embodiments, the loading system 20 may be configured to activate the counter-blower as the moving payload approaches a packing area 220, a bend 214 in the duct network 210, or the loading dock 204. In some embodiments, the loading system 20 is configured to activate the counter-blower when the cargo moves through the duct network 210 at a speed that exceeds a predetermined threshold speed.

The payload 30 generally includes a packaging component having an outer shape (e.g., cross-sectional shape) complementary to the inner shape of the ducts 210 to enable the payload 30 to travel along the duct 210 in response to a difference in duct pressure on one side of the payload 30 compared to the duct pressure on the other side of the payload 30. For example and without limitation, a loading system 20 including tubular (circular) ducts 210 may require payload 30 that includes a tubular (circular cross-sectional shaped) outer packaging component. In contrast, a loading system including rectangular ducts 210 may require payload 30 that includes a rectangular (rectangular cross-sectional shaped) outer packaging component. Generally, the packaging component of the payload 30 may be formed of any suitable material that does not create a significant frictional force when in contact with the inner surfaces of the duct 210.

The loading system 20 may additionally include one or more wind deflectors 250 disposed near the loading dock 200 and configured to reduce or even eliminate wind W or turbulent air patterns proximal to the loading dock 200. In some embodiments, the wind deflectors 250 surround or substantially surround the loading dock 200. In other embodiments, wind deflectors 250 are disposed to fill in or substantially fill in gaps between structural features of the building B that offer some preexisting wind deflection effects.

In some embodiments, the loading system 20 includes one or more air curtain generators 240 configured to direct air up and away from the loading dock 200. When activated, the air curtain generators 240 create a directional air shield 242 to reduce or even eliminate wind W or turbulent air patterns proximal to the loading dock 200. In some embodiments, the directional air shield 242 is disposed at an angle $\gamma$ of about 185° to about 225° from a vertical surface on which the air curtain generator(s) 240 are disposed, for example about 185°, about 186°, about 187°, about 188°, about 189°, about 190°, about 191°, about 192°, about 193°, about 194°, about 195°, about 196°, about 197°, about 198°, about 199°, about 200°, about 201°, about 202°, about 203°, about 204°, about 205°, about 206°, about 207°, about 208°, about 209°, about 210°, about 211°, about 212°, about 213°, about 214°, about 215°, about 216°, about 217°, about 218°, about 219°, about 220°, about 221°, about 222°, about 223°, about 224°, or about 225°. In some embodiments, the air curtain generator(s) 240 are configured to automatically generate a protective air curtain 242 when ambient wind W speeds reach or exceed a minimum threshold, for example about 20 miles per hour. In other embodiments, the air curtain generator(s) 240 are configured to automatically generate a protective air curtain 242 when a UAS 10 approaches within about 50 feet of an associated loading dock 200. In some embodiments, the air curtain generator(s) 240 are configured to automatically generate a protective air curtain 242 when a UAS 10 approaches within about 50 feet of an associated loading dock 200 only if ambient wind W speeds reach or exceed a minimum threshold, for example about 20 miles per hour.

In some embodiments, the present disclosure provides a loading dock 200 comprising a basket 204 including: a plurality of sides 204a, 204b that, together, form a wedge shape, a first opening 205 disposed through a first side 204a sized and shaped to enable a payload 30 to pass therethrough, and a second opening 206 disposed through a second side 204a, 204b and configured to enable air but not the payload to pass therethrough. In some embodiments, the wedge shape is an inverted truncated pyramidal shape. In some embodiments, the loading dock 200 further comprises a base 202 disposed at a bottom edge of the plurality of sides 204a, 204b. In some embodiments, the first side wall 204a extends upward from the base at an angle α. In some embodiments, the angle α is obtuse. In some embodiments, the inverted truncated pyramidal shape is an inverted truncated rectangular pyramid. In some embodiments, the inverted truncated pyramidal shape is not an inverted truncated square pyramid In some embodiments, the loading dock 200 further comprises at least one guidance flap 208 extending upwards from the basket 204 at an angle β. In some embodiments, the angle β is about 95° to about 180°.

In some embodiments, the loading dock 200 includes or is associated with an indicator (not shown) that encodes information corresponding to an orientation of the loading axis $LA_{200}$ of the loading dock 200. For example and without limitation, the indicator may be a visual indicator configured be scanned by the UAS 10, such as a QR code, a bar code, a graphical symbol (e.g., an arrow or compass), a pattern of two or more contrasting colors, and/or a gradient of two or more colors. In other embodiments, the indicator may enable near-field wireless communications with the UAS, for example via ultraviolet emission, radio frequency, near-field communication (NFC), Bluetooth-certified wireless communications protocol, WiFi wireless communications protocol, or similar non-visual electronic communication method. When present, the indicator may be configured to provide information to the UAS 10 about the location of the loading dock 200, the unique identity of the loading dock 200 (e.g., to reduce errors in automated deliveries by the UAS 10), the identity of the payload 30 to be delivered to the loading dock 200, the orientation of the loading axis $LA_{200}$, confirmation that the payload 30 has reached an associated loading or unloading area 220 (e.g., to enable the UAS 10 to decouple from the loading dock 200), or any similar information related to the coupling, uncoupling, and/or orientation of the UAS 10, and/or the location, orientation, and/or identity of the loading dock 200.

In some embodiments, the present disclosure provides a loading system 20 including a loading dock 200 configured to reversibly mate with the cargo cradle, a packing area 220 disposed remote from the loading dock and configured to receive the payload, and a conveying duct 210 in operable communication with the loading dock and the packing area and configured to convey the payload from the packing area to the loading dock. In some embodiments, the loading system 20 further comprises at least one pneumatic blower motor 230 in operable communication with the conveying duct and configured to draw or push the payload through the conveying duct towards the loading dock. In some embodiments, the loading system 20 further comprises a wind deflectors 250 disposed proximal to the loading dock and configured to deflect wind W away from the loading dock. In some embodiments, the loading system 20 further comprises an air curtain generator 240 configured to direct air at an angle γ away from the loading dock. In some embodiments, the loading dock 200 comprises a base 202; and a basket 204 extending upwards from the base and including a first opening 205 sized and shaped to enable the payload 30 to pass therethrough, and a second opening 206 configured to enable air but not the payload to pass therethrough. In some embodiments, the basket 204 has an inverted truncated pyramidal shape with a side wall 204a extending upward from the base 202 at an angle α. In some embodiments, the angle α is obtuse. In some embodiments, the inverted truncated pyramidal shape is an inverted truncated rectangular pyramid. In some embodiments, the inverted truncated pyramidal shape is not an inverted truncated square pyramid. In some embodiments, the loading dock 200 further comprises at least one guidance flap 208 extending upwards from the basket 204 at an angle β. In some embodiments, the angle β is about 95° to about 180°. In some embodiments, the loading axis $LA_{200}$ of the loading dock 200 is oriented at a known heading relative to geographic north. In some embodiments, the cargo cradle 102 comprises a payload hold area 104 configured to receive the payload 30 therein. In some embodiments, the cargo cradle 102 includes a first opening 105 configured to enable the payload 30 to pass therethrough, and a second opening 106 configured to enable air but not the payload 30 to pass therethrough. In some embodiments, the cargo cradle 102 includes side walls 102a configured to contact all or substantially all interior surfaces of side walls of the basket 204 when the UAS 10 is docked with the loading dock 200. In some embodiments, the cargo cradle 102 has an inverted truncated pyramidal shape with a side wall 102a extending upward from a base 102d at an angle δ. In some embodiments, the angle δ is obtuse. In some embodiments, the inverted truncated pyramidal shape is an inverted truncated rectangular pyramid. In some embodiments, the inverted truncated pyramidal shape is not an inverted truncated square pyramid. In some embodiments, the UAS 10 further comprises: a body 100 disposed above the cargo cradle 102; and at least one propeller 110 disposed above the body. In other embodiments, the UAS 10 is a fixed wing unmanned aircraft that includes one or more propellers 110. In other embodiments, the UAS 10 is a fixed wing unmanned aircraft that does not include a propeller.

3. Cargo Delivery Systems

The present disclosure provides cargo delivery systems comprising at least one UAS 10 as described herein, and at least one loading dock 200 as described herein and configured to couple with (e.g., temporarily couple with) the cargo cradle 102 of the UAS 10. In some embodiments, the loading dock 200 is incorporated into a loading system 20 as described herein. In some embodiments, the cargo delivery system includes a second loading dock 200 remote from the first loading dock 200 and configured to couple with (e.g., temporarily couple with) the cargo cradle 102 of the UAS 10. In some embodiments, the second loading dock 200 is incorporated into a second loading system 20 as described herein.

Figure 4:
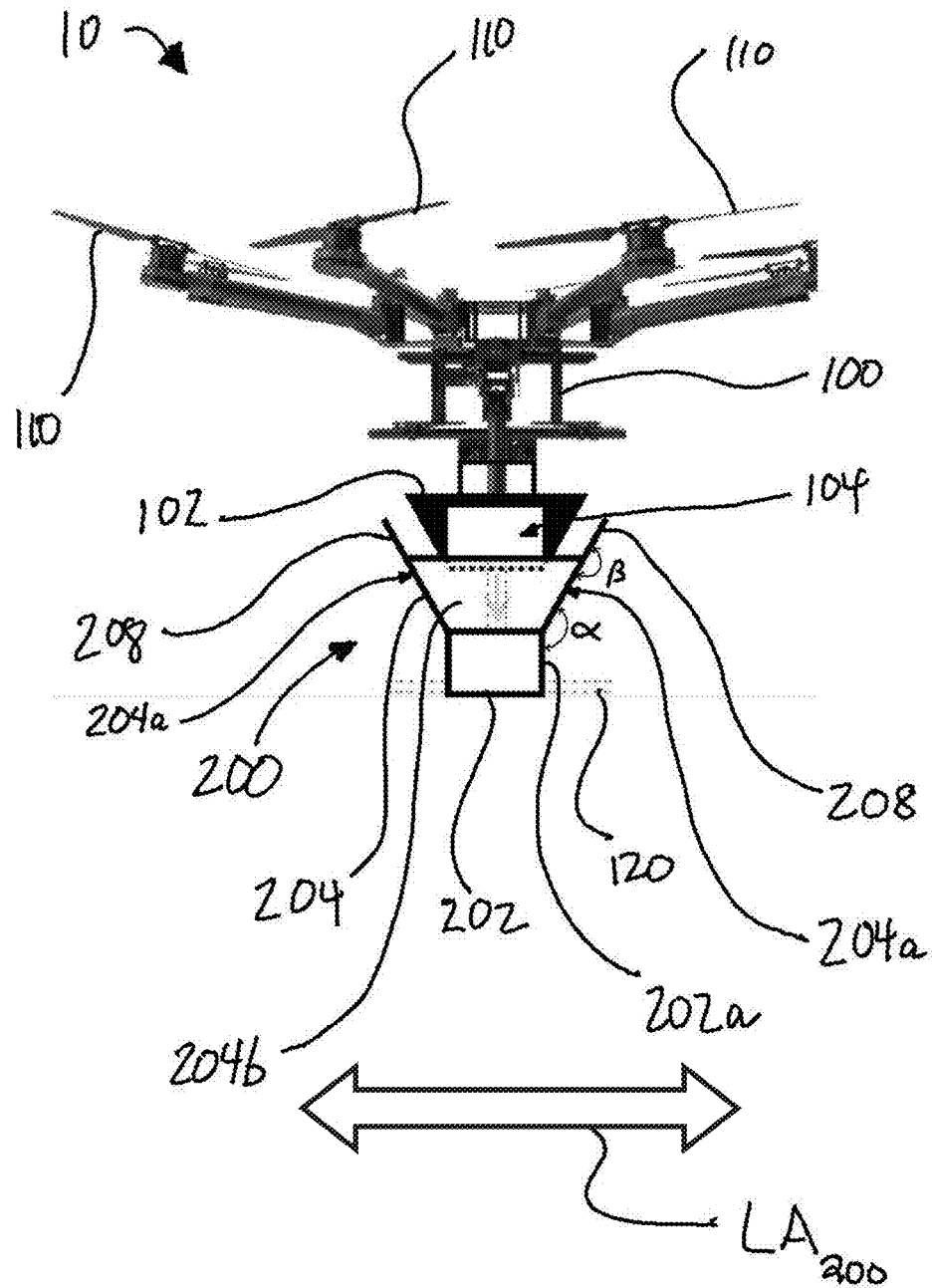
FIG. 4 shows a port side view of the UAS of FIG. 1 coupling or uncoupling from a loading dock consistent with one embodiment of the present disclosure.
Figure 5:
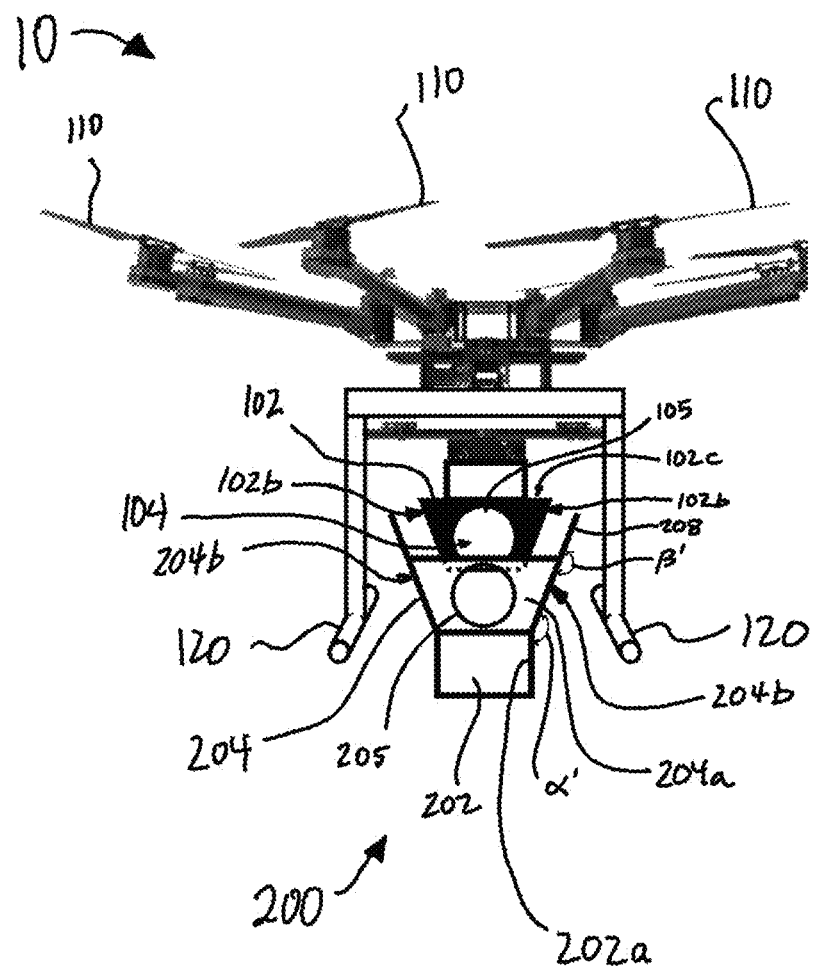
FIG. 5 shows a front view of the UAS of FIG. 1 coupling or uncoupling from a loading dock consistent with one embodiment of the present disclosure.
Figure 6:
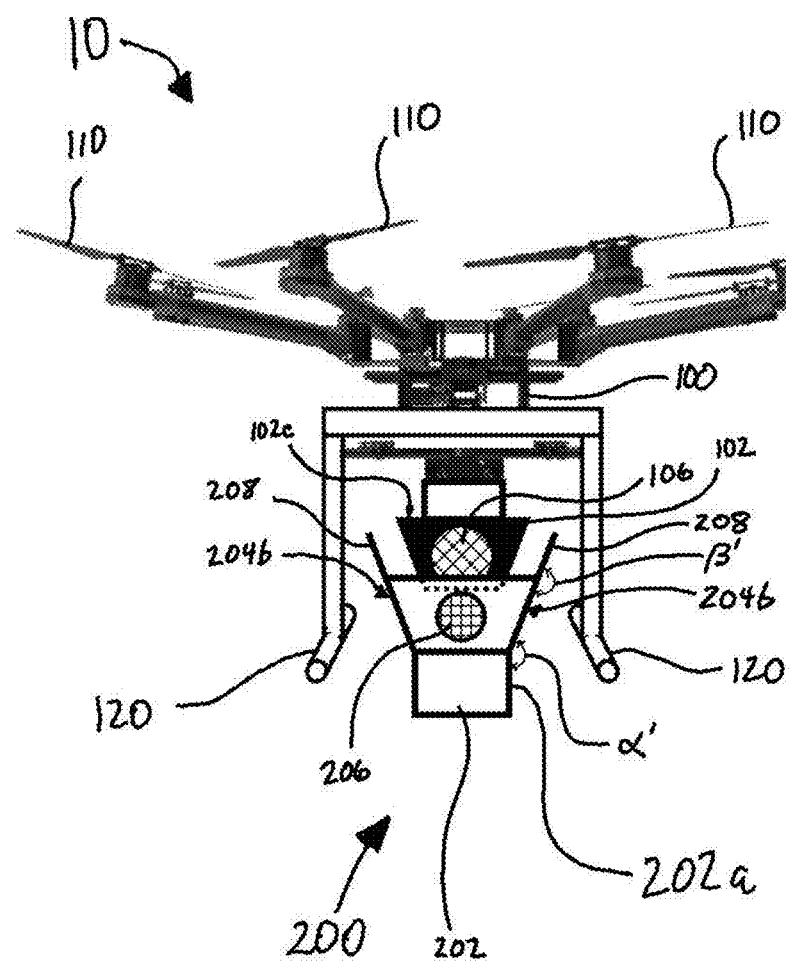
FIG. 6 shows a rear view of the UAS of FIG. 1 coupling or uncoupling from a loading dock consistent with one embodiment of the present disclosure.
Figure 7:
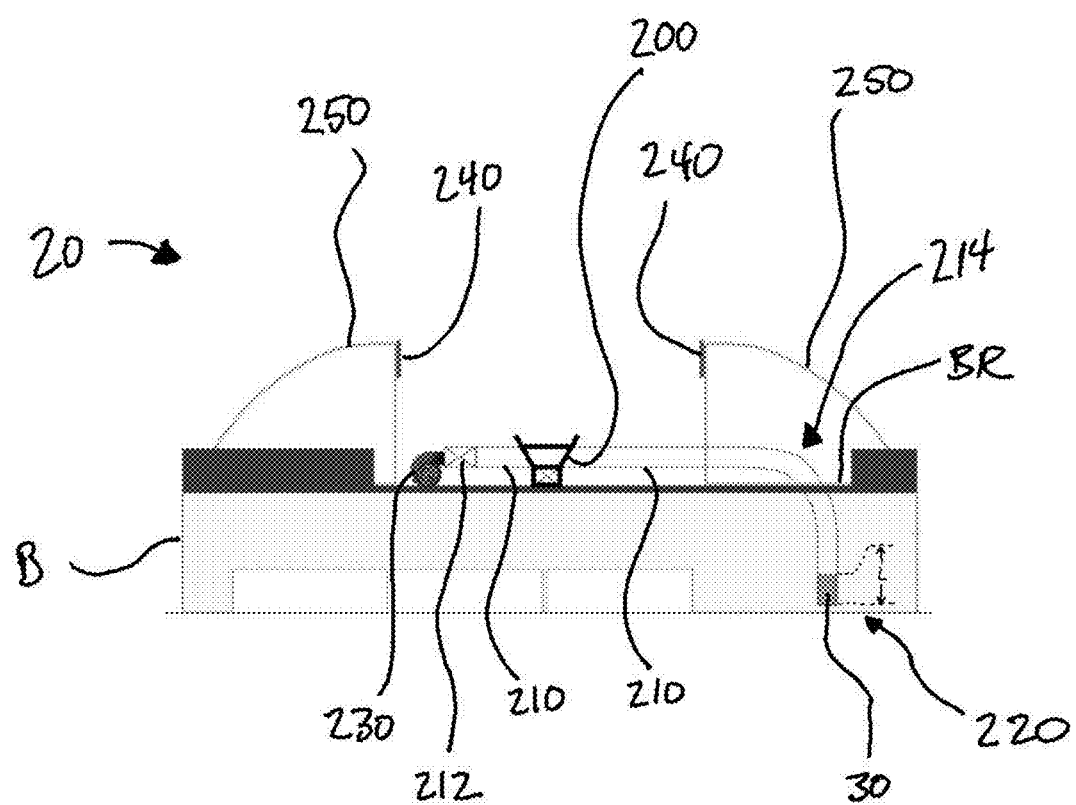
FIG. 7 shows a schematic representative view of a loading system consistent with one embodiment of the present disclosure.
Figure 8:
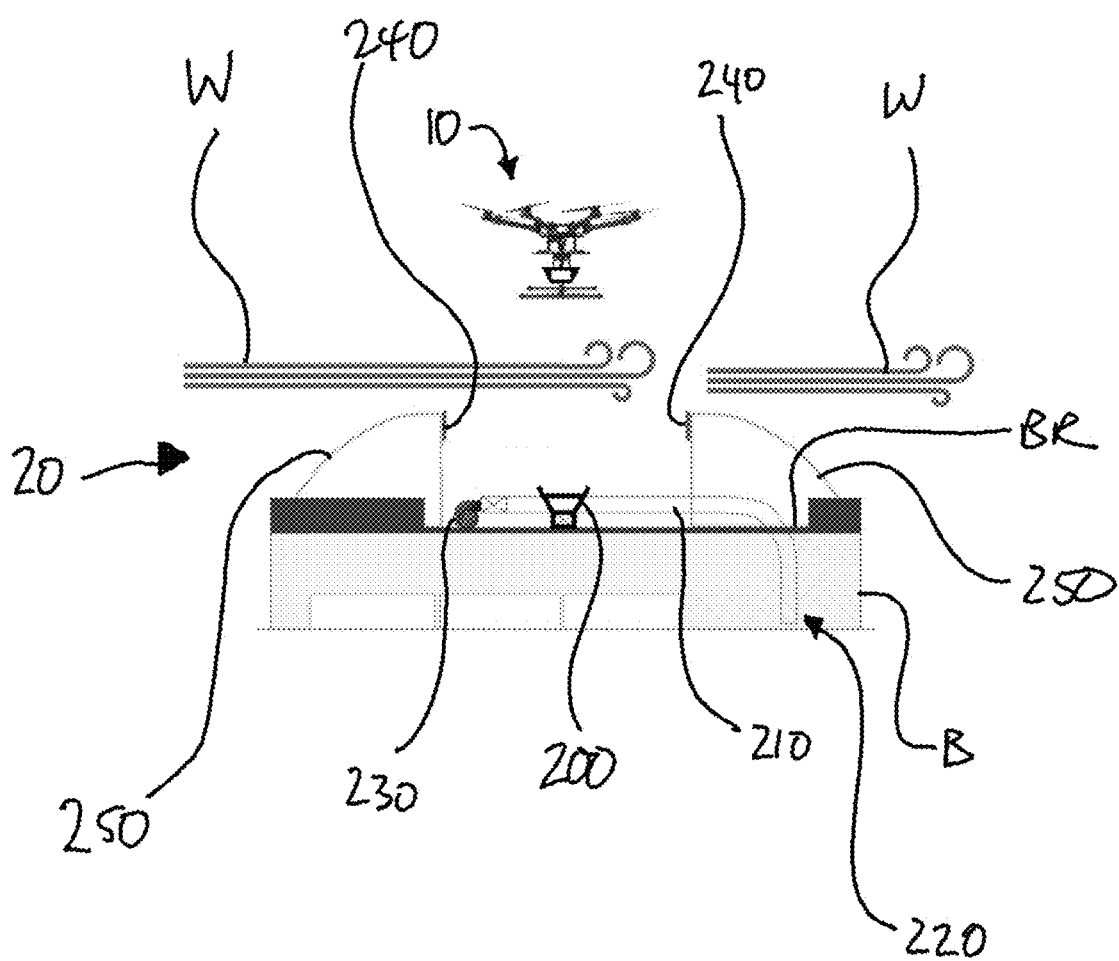
FIG. 8 shows a schematic representative view of the UAS of FIG. 1 approaching the loading system of FIG. 7.
Figure 9:
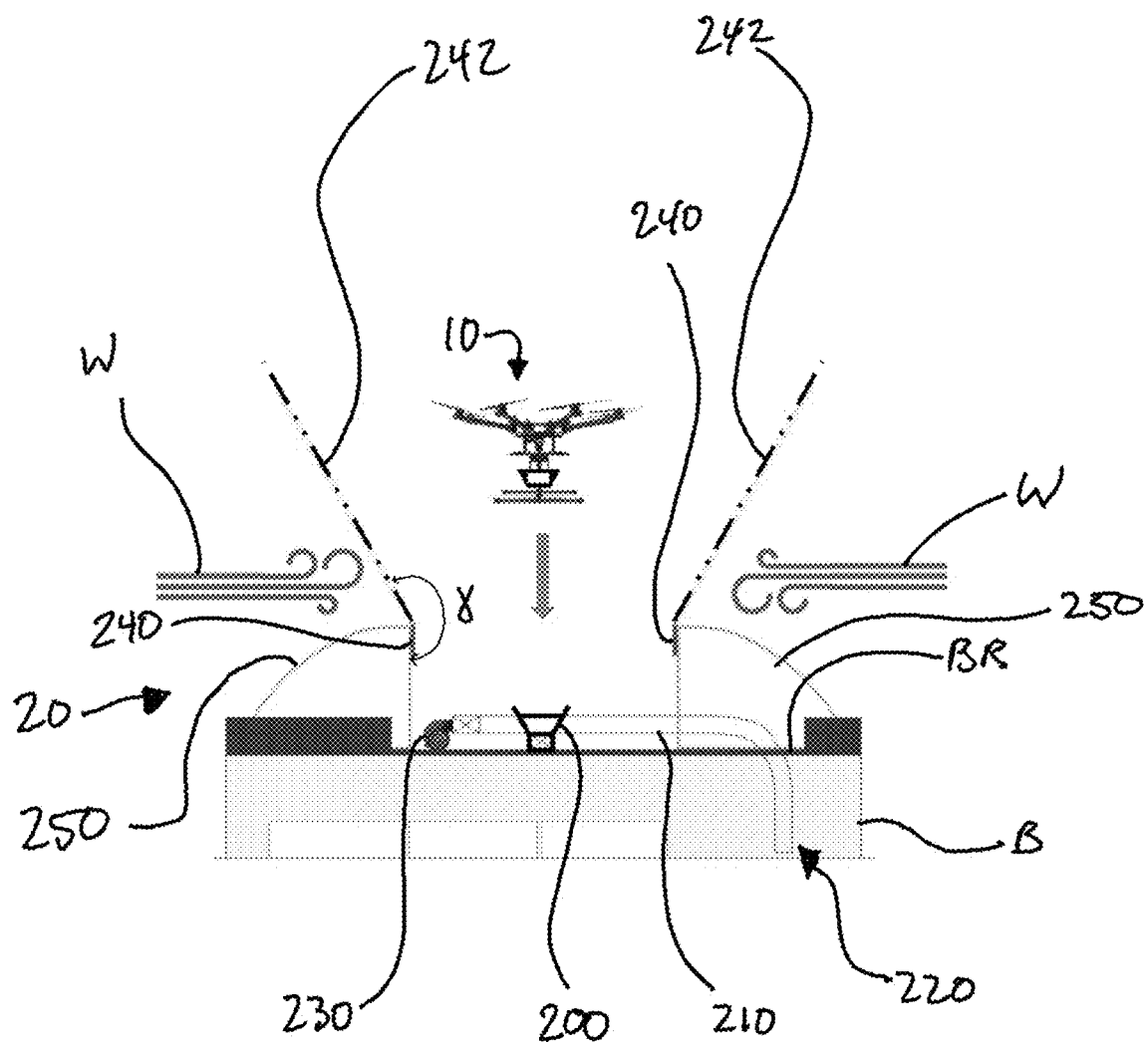
FIG. 9 shows a schematic representative view of the UAS of FIG. 1 approaching the loading system of FIG. 7 with reduced wind effects proximal to the loading dock by operation of one or more air curtain generators consistent with one embodiment of the present disclosure.
Figure 10:
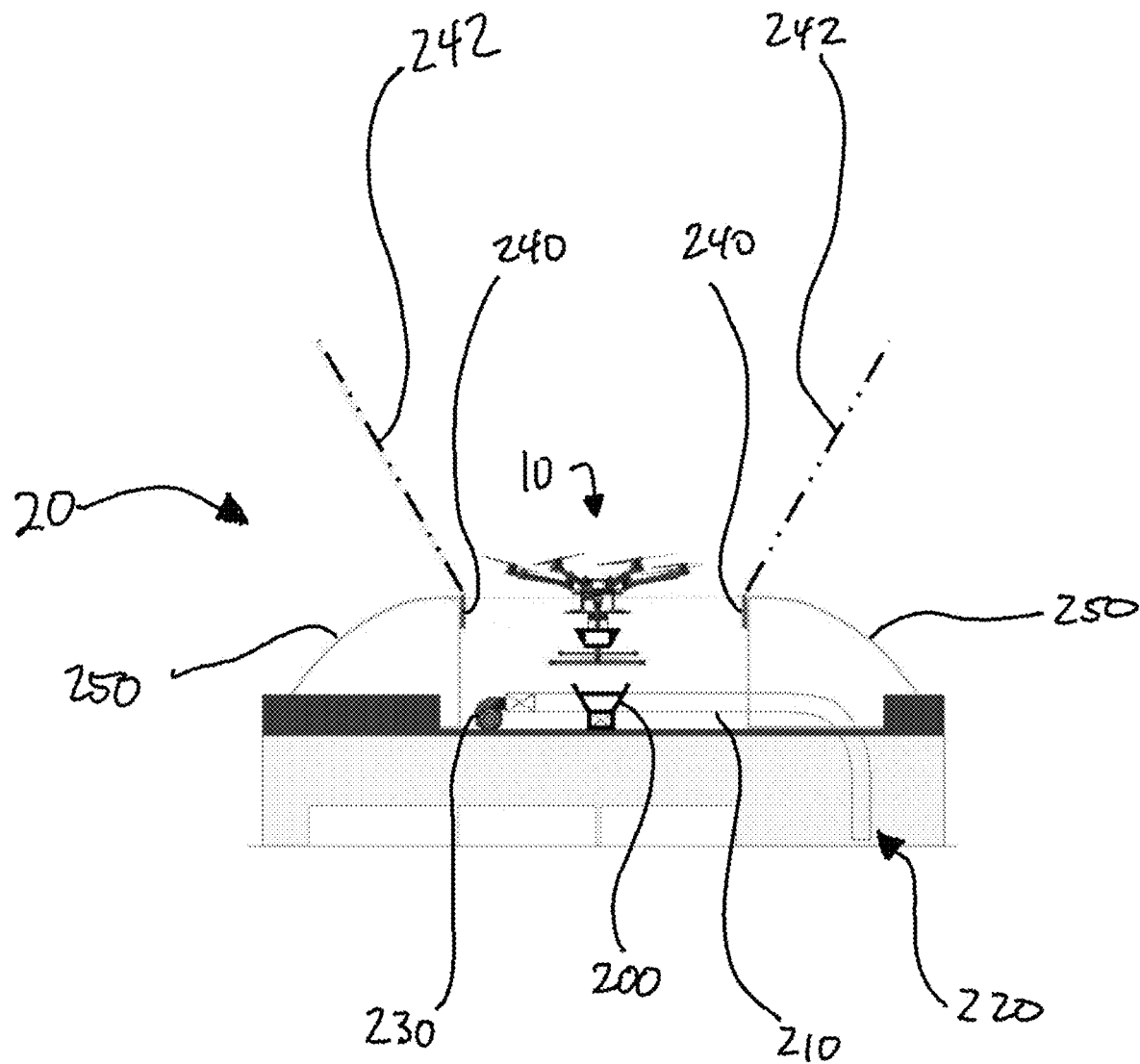
FIG. 10 shows a schematic representative view of the UAS of FIG. 1 on close approach to the loading system of FIG. 7.
Figure 11:
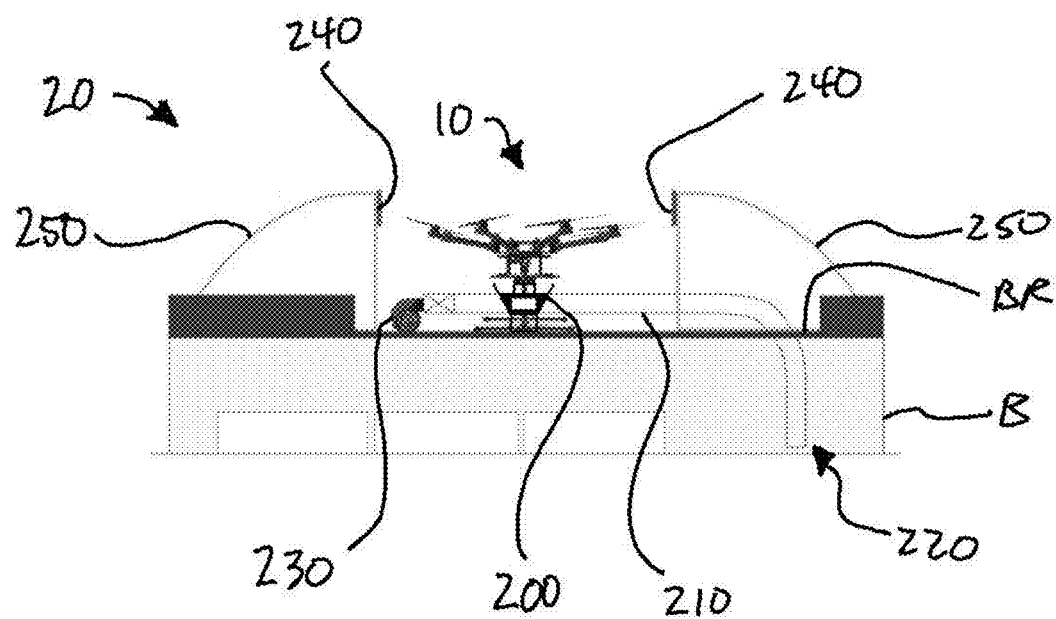
FIG. 11 shows a schematic representative view of the UAS of FIG. 1 coupled to the loading system of FIG. 7.
Figure 12:
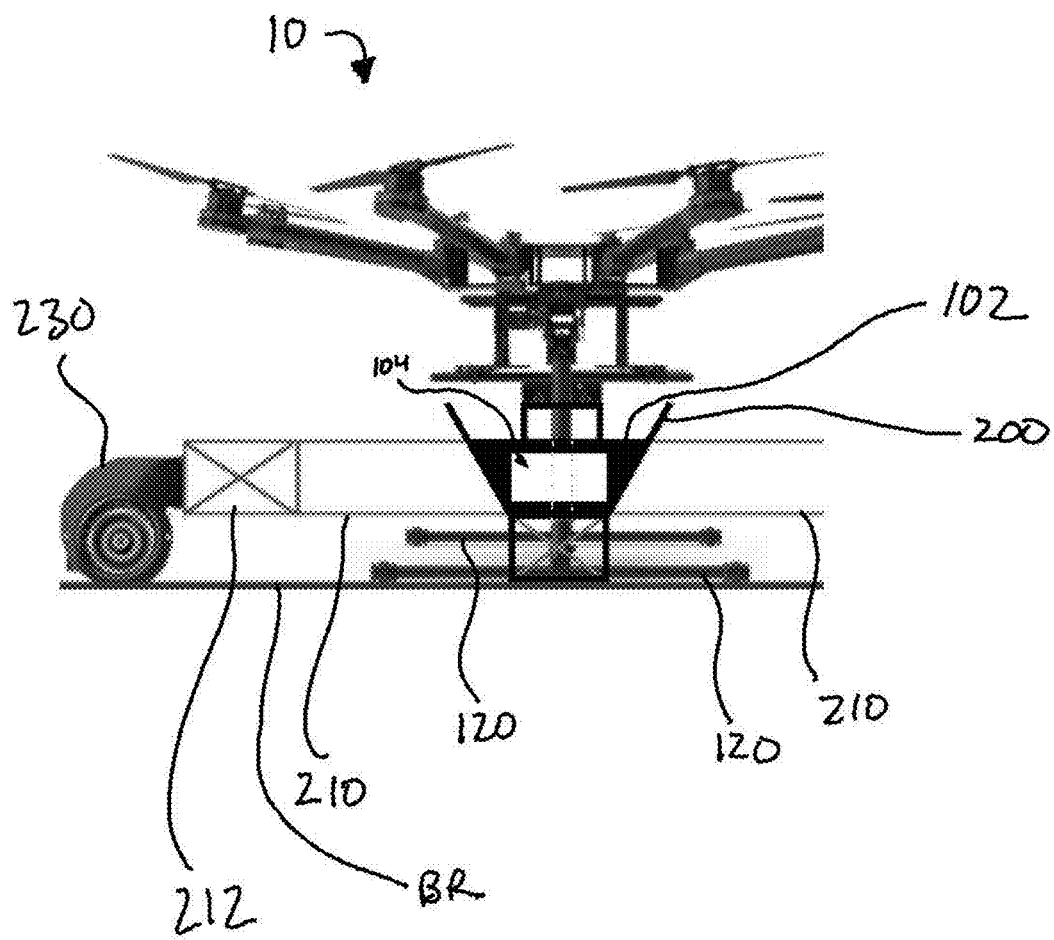
FIG. 12 shows an enlarged schematic representative view of a portion of FIG. 11.
Figure 13:
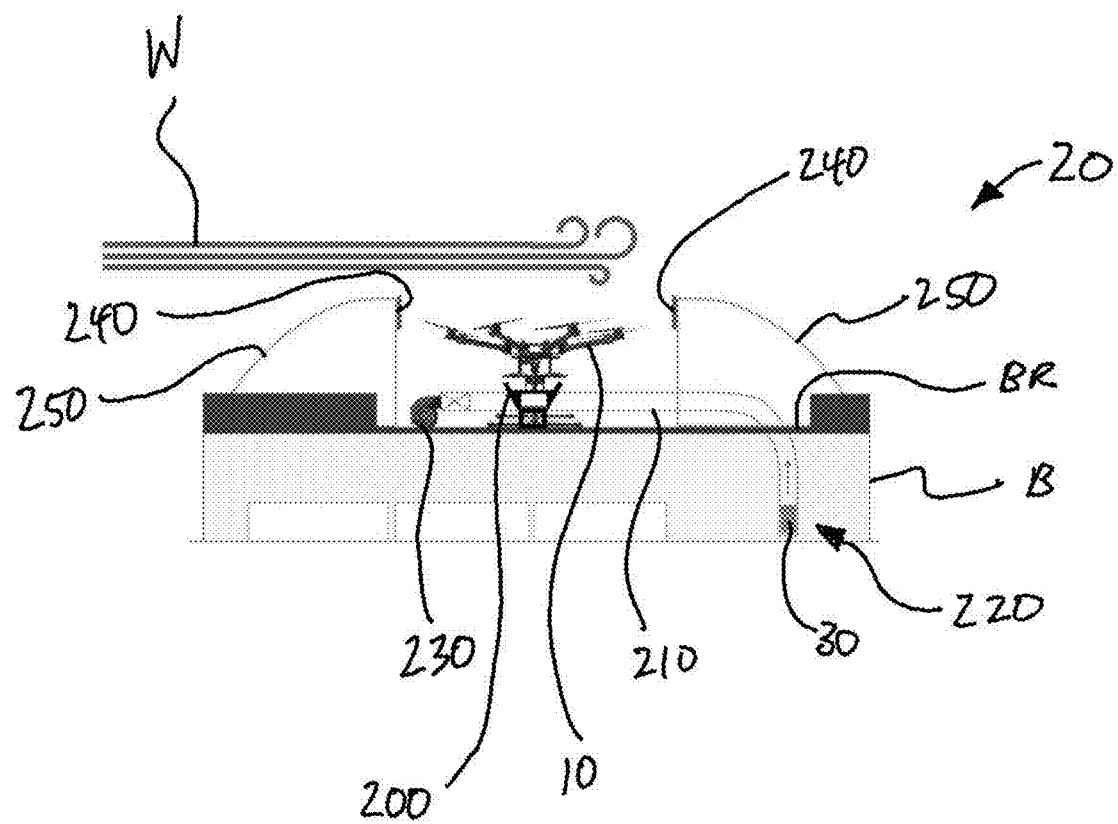
FIG. 13 shows a schematic representative view of a payload entering the loading system of FIG. 7.

In use, a UAS 10 may couple with a loading dock 200 of a cargo delivery system consistent with the present disclosure, such as a loading system 20 consistent with the one shown representatively in FIG. 7. As the UAS 10 approaches the loading dock 200 (FIG. 8), the loading system 20 may determine the speed of ambient wind W (e.g., using one or more wind speed sensors, not shown). If the wind speed exceeds a predetermined threshold (e.g., 20 miles per hour), air curtain generators 240 proximal to the loading dock 200 may activate to create an air curtain 242 surrounding or substantially surrounding the loading dock 200. In some embodiments, the loading system 20 selectively activates only some but not all of the air curtain generators 240, for example one or more air curtain generators 240 on the side of the loading dock 200 from which wind W is blowing towards the loading dock 200. As the UAS 10 approaches the loading dock 200, the UAS 10 orients its associated cargo cradle 102 such that the loading axis $LA_{104}$ of its cargo cradle 102 is substantially aligned with the loading axis $LA_{200}$ of the loading dock 200 (FIGS. 1, 4, 10). As the cargo cradle 102 descends into the basket 204 of the loading dock 200, the relative shapes of the cargo cradle 102 and the basket 204 complete substantial alignment of the loading axis $LA_{104}$ of the cargo cradle 102 and the loading axis $LA_{200}$ of the loading dock such that the loading opening 105 of the cargo cradle 102 is in substantial alignment with and immediately adjacent to the loading opening 205 of the loading dock 200. When the cargo cradle 102 is coupled to the basket 200, the associated duct network 210 is substantially pneumatically sealed (FIGS. 11-12).

Figure 14:
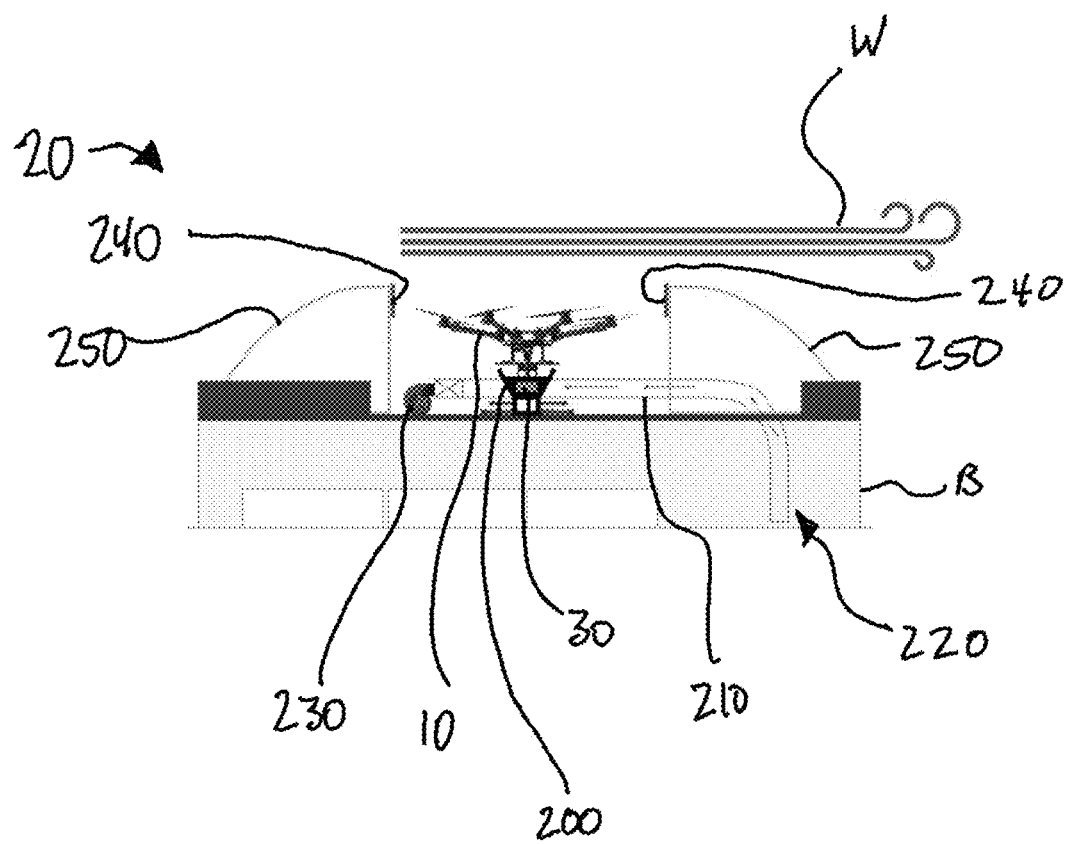
FIG. 14 shows a schematic representative view of the payload of FIG. 13 after being loaded into the cargo cradle of the UAS of FIG. 1 while the UAS is coupled to the loading system of FIG. 7.

Before or after the cargo cradle 102 is seated in the basket 204, a payload 30 may be placed in a packing area 220 of the duct network 210. After the cargo cradle 102 is seated in the basket 204 and the payload 30 is in the duct network 210, the one or more blower motors 230 may activate to reduce pressure in the duct network 210. The reduction in air pressure between the payload 30 and the blower motor 230 may cause the payload 30 to advance towards the blower motor 230. Upon reaching the payload hold area 104 of the cargo cradle 102, the payload 30 passes through the first opening 205 of the basket 204 and the first opening 105 of the cargo cradle 102 to enter the payload hold area 104. Advancement of the payload 30 through the payload hold area 104 is stopped when the payload 30 reaches (e.g., contacts) the second opening 106 or the opposite wall 104a of the cargo cradle 102, both of which are configured not to enable the payload 30 to pass through and out of the payload hold area 104 even while the blower motor 230 is activated (FIG. 14). The air curtain generator(s) 240 may not be generating an air curtain 242 while the payload 30 is advancing towards the UAS 10 in some embodiments. In other embodiments, the air curtain generator(s) 240 continue to generate an air curtain 242 while the payload 30 is advancing towards the UAS 10.

Figure 15:
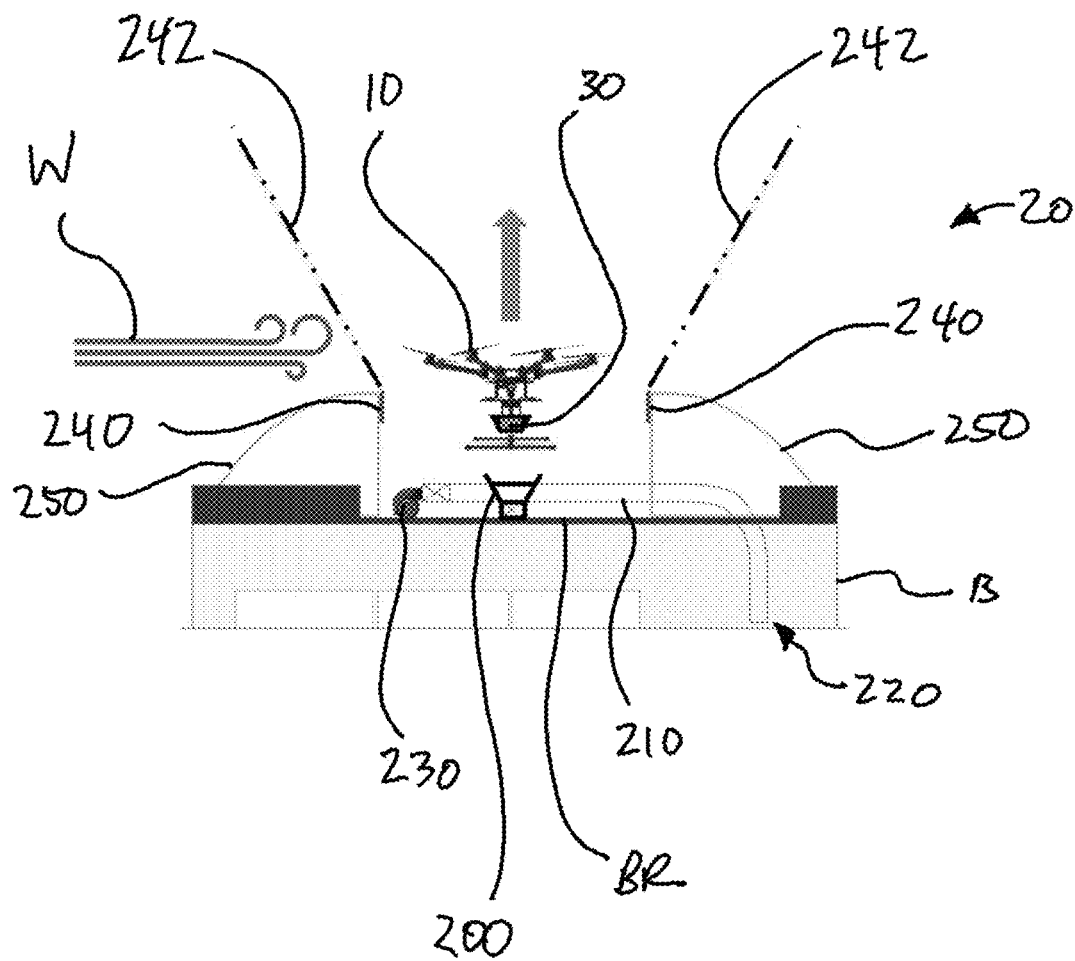
FIG. 15 shows a schematic representative view of the UAS of FIG. 1 carrying the payload away from the loading system of FIG. 7 with reduced wind effects proximal to the loading dock by operation of one or more air curtain generators consistent with one embodiment of the present disclosure.
Figure 16:
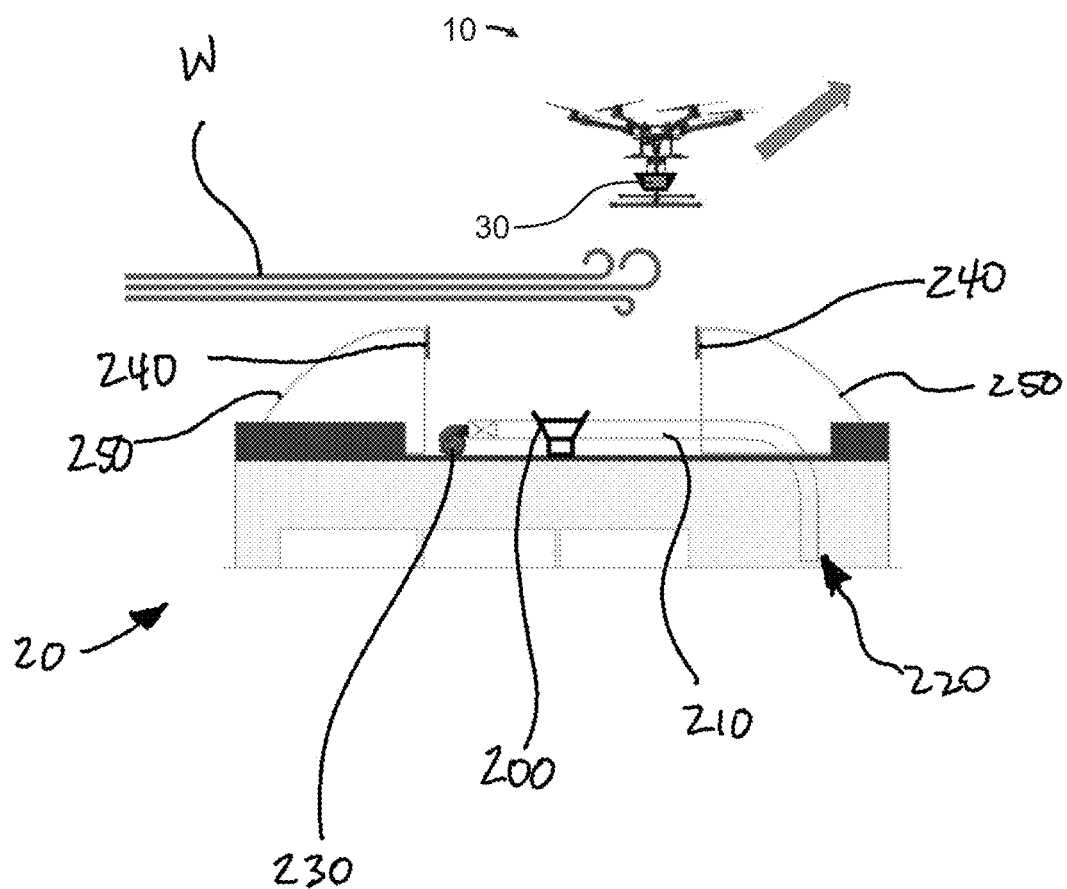
FIG. 16 shows a schematic representative view of the UAS of FIG. 1 carrying the payload further away from the loading system of FIG. 7.
Figure 17:
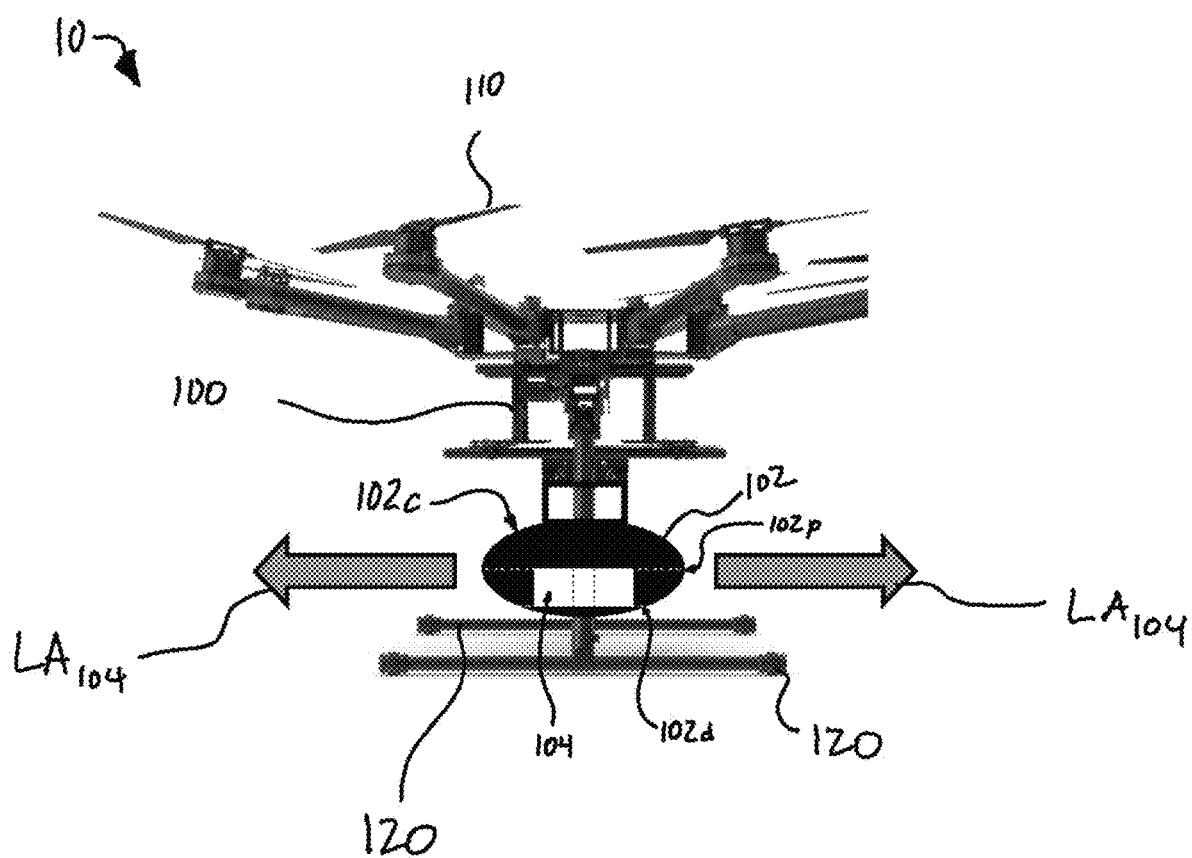
FIG. 17 shows a port side view of an unmanned aircraft system consistent with one embodiment of the present disclosure. The starboard side of the unmanned aircraft system is a substantial mirror image of the view of FIG. 17.
Figure 18:
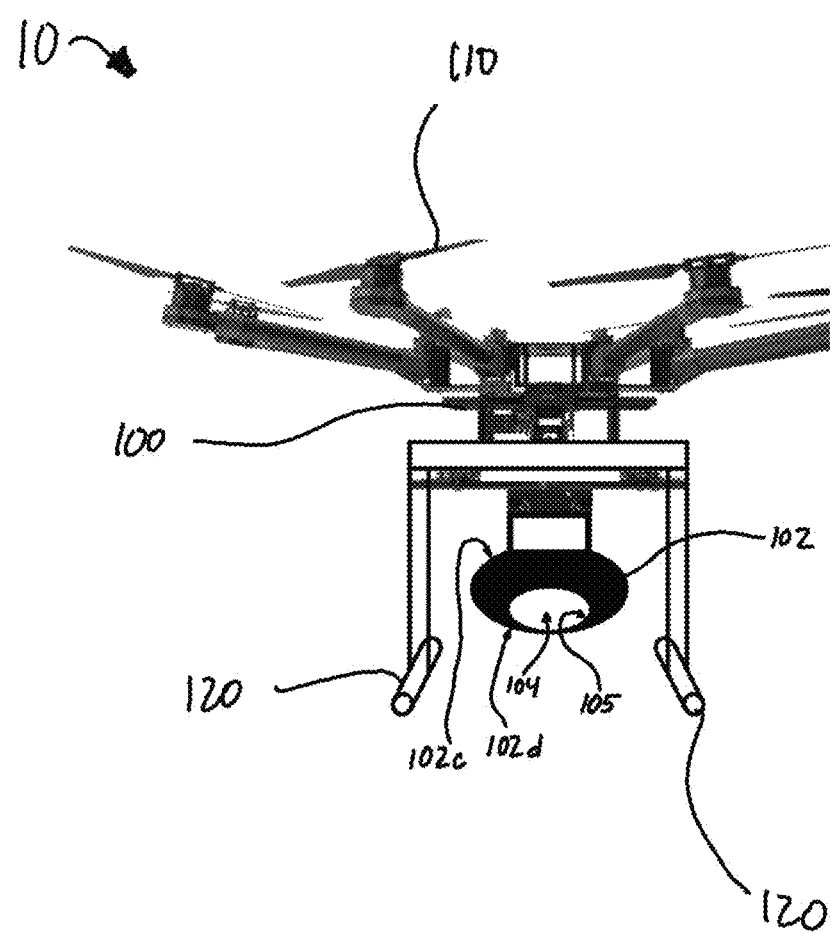
FIG. 18 shows a front view of the UAS of FIG. 17.
Figure 19:
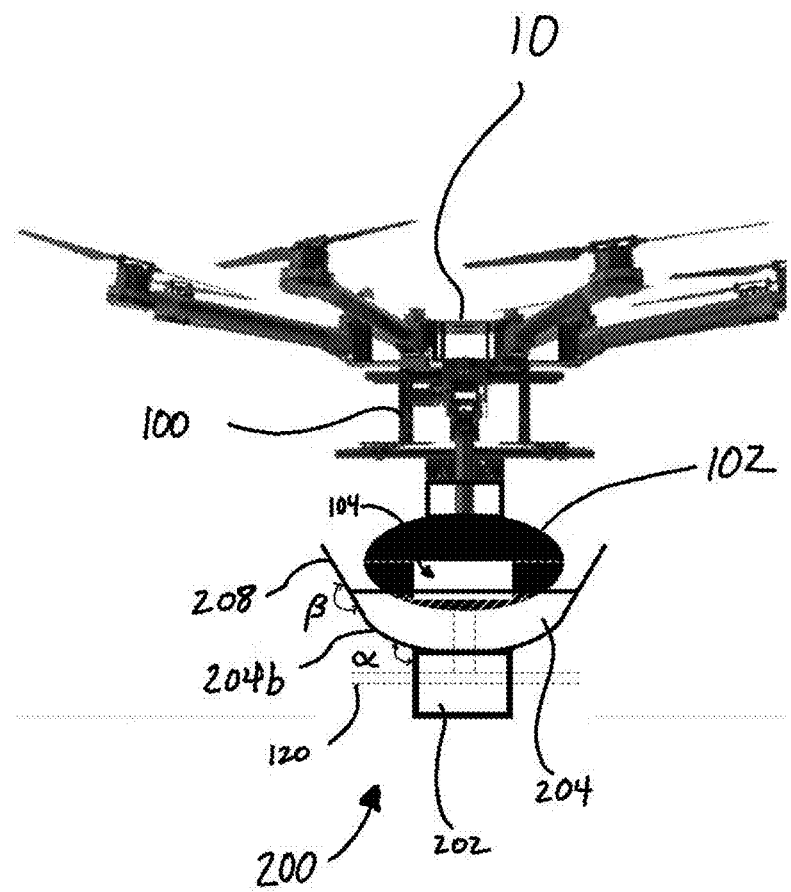
FIG. 19 shows a port side view of the UAS of FIG. 17 coupling or uncoupling from a loading dock consistent with one embodiment of the present disclosure.
Figure 20:
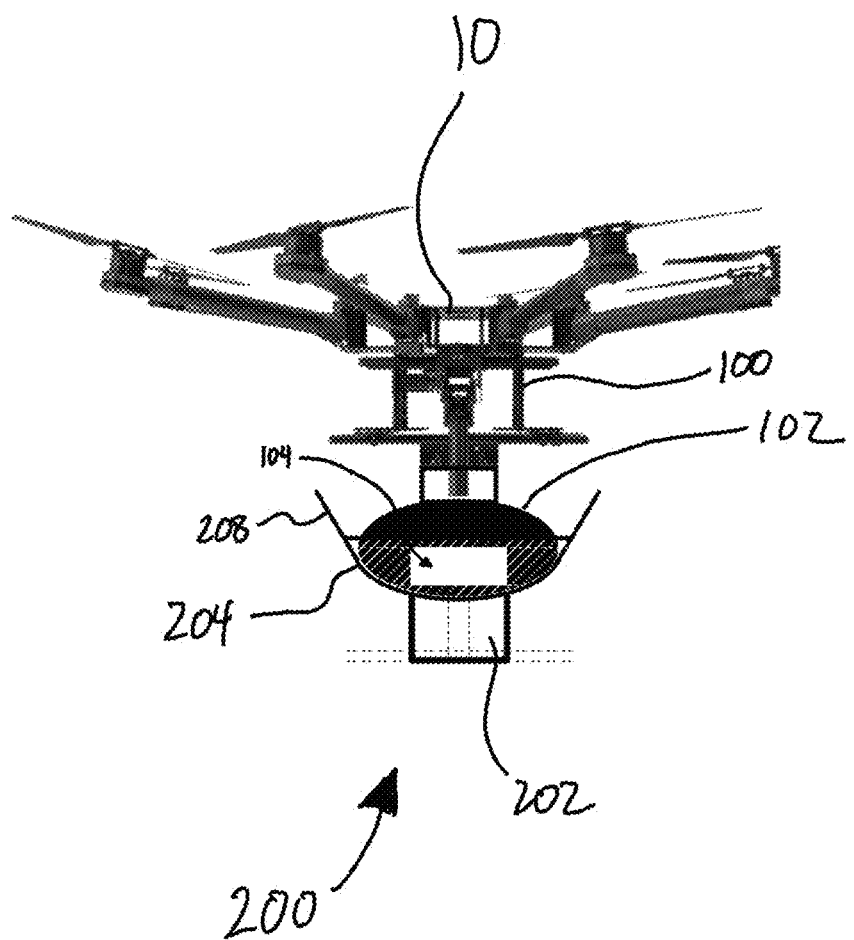
FIG. 20 shows a schematic representative view of the UAS of FIG. 17 coupled to the loading system of FIG. 7.

After the payload 30 is disposed in the payload hold area 104, the blower motor(s) 230 stop drawing air through the duct network 210, or alternatively the duct network 210 is vented to restore air pressure in the duct network 210 to a level equal to or substantially similar to ambient air pressure outside the duct network 210. When the air pressure inside the duct network 210 is at or near ambient air pressure outside the duct network 210, the UAS 10 (now with the payload 30 in the payload hold area 104) can decouple from the loading dock 200 (FIG. 15). As the UAS 10 climbs in altitude away from the loading dock, the air curtain generator(s) 240 may optionally generate an air curtain 242, for example if ambient winds W exceed a threshold speed (e.g., 20 miles per hour). After the UAS 10 flies above the wind deflectors 250 (if present) or when the UAS 10 has an approximate altitude safely away from the loading dock 200 (e.g., when the UAS 10 is about 50 feet above the loading dock 200), the air curtain generator(s) 240 may stop generating the air curtain 242 (FIG. 16).

In some embodiments, the UAS 10 may then travel to another loading system 20 to deliver the payload 30 by a process essentially reverse of that described above. For example, the UAS 10 may couple with the basket 204 of a second loading dock 200 of a second loading system 20 remote from the first loading system 20. Coupling of the cargo cradle 102 and the second basket 204 may occur by the same process described above between the empty UAS 10 and the first loading dock 200. When coupling with the second loading dock 200 is complete, the blower motor 230 of the second loading system 20 may activate to either draw the payload 30 from the payload hold area 104 via reduced air pressure (e.g., when the blower motor 230 is disposed on the same side of the duct network 210 as the first opening 105 of the cargo cradle 102 and the same side of the duct network 210 as the first opening 205 of the basket 204) or blow the payload 30 from the payload hold area 104 via increased air pressure (e.g., when the blower motor 230 is disposed on the same side of the duct network 210 as the second opening 106 of the cargo cradle 102 and the same side of the duct network 210 as the second opening 206 of the basket 204). After the payload 30 is unloaded from the payload hold area 104, the UAS 10 (now empty of payload) may uncouple from the basket 204 as described above. Alternatively, the UAS 10 may remain engaged with (e.g., coupled with) the basket 240 until a second payload 30 is loaded into its payload hold area 104 for a subsequent delivery.

In some embodiments, the present disclosure provides a cargo delivery system comprising an unmanned aircraft system 10 including a cargo cradle 102 configured to receive a payload 30; and a loading system 20 including a loading dock 200 configured to reversibly mate with the cargo cradle, a packing area 220 disposed remote from the loading dock and configured to receive the payload, and a conveying duct 210 in operable communication with the loading dock and the packing area and configured to convey the payload from the packing area to the loading dock. In some embodiments, the cargo delivery system further comprises at least one pneumatic blower motor 230 in operable communication with the conveying duct and configured to draw or push the payload through the conveying duct towards the loading dock. In some embodiments, the cargo delivery system further comprises a wind deflectors 250 disposed proximal to the loading dock and configured to deflect wind W away from the loading dock. In some embodiments, the cargo delivery system further comprises an air curtain generator 240 configured to direct air at an angle γ away from the loading dock. In some embodiments, the loading dock 200 comprises a base 202; and a basket 204 extending upwards from the base and including a first opening 205 sized and shaped to enable the payload 30 to pass therethrough, and a second opening 206 configured to enable air but not the payload to pass therethrough. In some embodiments, the basket 204 has an inverted truncated pyramidal shape with a side wall 204a extending upward from the base 202 at an angle α. In some embodiments, the angle α is obtuse. In some embodiments, the inverted truncated pyramidal shape is an inverted truncated rectangular pyramid. In some embodiments, the inverted truncated pyramidal shape is not an inverted truncated square pyramid. In some embodiments, the loading dock 200 further comprises at least one guidance flap 208 extending upwards from the basket 204 at an angle β. In some embodiments, the angle β is about 95° to about 180°. In some embodiments, the loading axis $LA_{200}$ of the loading dock 200 is oriented at a known heading relative to geographic north. In some embodiments, the cargo cradle 102 comprises a payload hold area 104 configured to receive the payload 30 therein. In some embodiments, the cargo cradle 102 includes a first opening 105 configured to enable the payload 30 to pass therethrough, and a second opening 106 configured to enable air but not the payload 30 to pass therethrough. In some embodiments, the cargo cradle 102 includes side walls 102a configured to contact all or substantially all interior surfaces of side walls of the basket 204 when the UAS 10 is docked with the loading dock 200. In some embodiments, the cargo cradle 102 has an inverted truncated pyramidal shape with a side wall 102a extending upward from a base 102d at an angle δ. In some embodiments, the angle δ is obtuse. In some embodiments, the inverted truncated pyramidal shape is an inverted truncated rectangular pyramid. In some embodiments, the inverted truncated pyramidal shape is not an inverted truncated square pyramid. In some embodiments, the UAS 10 further comprises: a body 100 disposed above the cargo cradle 102; and at least one propeller 110 disposed above the body. In other embodiments, the UAS 10 is a fixed wing unmanned aircraft that does not include a propeller.

4. Methods of Delivering Cargo

The present disclosure provides methods of delivering payload 30 via UAS 10. In some embodiments, the method comprises coupling the cargo cradle 102 of a UAS 10 to a loading dock 200 of a loading system 20. In some embodiments, the step of coupling comprises determining the speed and/or prevailing direction of ambient wind W as the UAS 10 approaches the loading dock 200 (FIG. 8) and activating one or more air curtain generators 240 to create an air curtain 242 if the determined wind speed exceeds a predetermined threshold (e.g., 20 miles per hour). In some embodiments, the step of activating one or more air curtain generators 240 includes activating only some but not all of the air curtain generators 240 of the loading system 20. For example and without limitation, the step of activating one or more air curtain generators 240 may include activating one or more air curtain generators 240 on the side of the loading dock 200 from which wind W is blowing towards the loading dock 200.

In some embodiments, the method comprises retracting a cover 203b from the loading dock 200, for example to enable the cargo cradle 102 to mate with the basket 204 portion of the loading dock 200.

The method further comprises orienting the cargo cradle 102 of the UAS 10 relative to the basket 204 of the loading dock 200, for example such that the loading axis $LA_{104}$ of the cargo cradle 102 is substantially aligned (e.g., within about 15° of perfect alignment) with the loading axis $LA_{200}$ of the loading dock 200. As the cargo cradle 102 descends into the basket 204 of the loading dock 200, the relative shapes of the cargo cradle 102 and the basket 204 complete substantial alignment of the loading axis $LA_{104}$ of the cargo cradle 102 and the loading axis $LA_{200}$ of the loading dock such that the loading opening 105 of the cargo cradle 102 is in substantial alignment with and immediately adjacent to the loading opening 205 of the loading dock 200. When the cargo cradle 102 is coupled to the basket 200, the associated duct network 210 is substantially pneumatically sealed.

The method further comprises loading a payload 30 into the payload hold area 104 of the cargo cradle 102. Before or after the cargo cradle 102 is seated in the basket 204, the payload 30 may be placed in a packing area 220 of the duct network 210. After the cargo cradle 102 is seated in the basket 204 and the payload 30 is in the duct network 210, the method may comprise activating one or more blower motors 230 to reduce pressure in the duct network 210 between the payload 30 and the payload hold area 104. The reduction in air pressure between the payload 30 and the blower motor 230 may cause the payload 30 to advance towards the blower motor 230. Upon reaching the payload hold area 104 of the cargo cradle 102, the payload 30 passes through the first opening 205 of the basket 204 and the first opening 105 of the cargo cradle 102 to enter the payload hold area 104. Advancement of the payload 30 through the payload hold area 104 is stopped when the payload 30 reaches (e.g., contacts) the second opening 106 or the opposite wall 104a of the cargo cradle 102, both of which are configured not to enable the payload 30 to pass through and out of the payload hold area 104 even while the blower motor 230 is activated. In some embodiments, the method comprises causing the air curtain generator(s) 240 to stop generating an air curtain 242 while the payload 30 is advancing towards the UAS 10. In other embodiments, the method comprises enabling the air curtain generator(s) 240 to continue generating an air curtain 242 while the payload 30 is advancing towards the UAS 10.

The method further comprises uncoupling the UAS 10 and its loaded payload 30 from the loading system 20. For example, the method may comprises causing the blower motor(s) 230 to stop drawing air through the duct network 210, and/or venting the duct network 210 to restore air pressure in the duct network 210 to a level equal to or substantially similar to ambient air pressure outside the duct network 210. When the air pressure inside the duct network 210 is at or near ambient air pressure outside the duct network 210, the UAS 10 (now with the payload 30 in the payload hold area 104) can decouple from the loading dock 200, for example by causing the propeller(s) 110 of the UAS 10 to activate. As the UAS 10 climbs in altitude away from the loading dock, the method may optionally include causing the air curtain generator(s) 240 to generate an air curtain 242, for example if ambient winds W exceed a threshold speed (e.g., 20 miles per hour). After the UAS 10 flies above the wind deflectors 250 (if present) or when the UAS 10 has an approximate altitude safely away from the loading dock 200 (e.g., when the UAS 10 is about 50 feet above the loading dock 200), the method may additionally include causing the air curtain generator(s) 240 to stop generating the air curtain 242.

In some embodiments, the method further comprises causing the UAS 10 and its loaded payload 30 to travel to another loading system 20. The process of delivering the payload 30 to a second loading system 20 may include coupling the UAS 10 with the basket 204 of a second loading dock 200 of a second loading system 20 remote from the first loading system 20 by the same or similar steps as described above for coupling the empty UAS 10 and the first loading dock 200 of the first loading system 20. When coupling with the second loading dock 200 is complete, the method may additionally include causing the blower motor 230 of the second loading system 20 to activate to either draw the payload 30 from the payload hold area 104 via reduced air pressure (e.g., when the blower motor 230 is disposed on the same side of the duct network 210 as the first opening 105 of the cargo cradle 102 and the same side of the duct network 210 as the first opening 205 of the basket 204) or to blow the payload 30 from the payload hold area 104 via increased air pressure (e.g., when the blower motor 230 is disposed on the same side of the duct network 210 as the second opening 106 of the cargo cradle 102 and the same side of the duct network 210 as the second opening 206 of the basket 204). After the payload 30 is unloaded from the payload hold area 104, the method may further comprise causing the UAS 10 (now empty of payload 30) to decouple from the basket 204 as described above. Alternatively, the method may comprise causing the UAS 10 to remain engaged with (e.g., coupled with) the basket 240 of the second loading system 20 until a second payload 30 is loaded into its payload hold area 104 for a subsequent delivery to the first loading system 20 or to a third, different loading system 20 remote from the first loading system 20 and the second loading system 20.

In some embodiments, the present disclosure provides a method of sending payload 30 by UAS 10 to a predetermined destination, the method comprising: coupling the cargo cradle 102 of a UAS 10 as disclosed herein to a first loading dock 200 as disclosed herein; causing a payload 30 to pass through the first side wall 204a of the loading dock 200 and into the cargo cradle of the UAS 10; and thereafter uncoupling the UAS 10 from the first loading dock 200; causing the UAS 10 to travel to a predetermined destination that is remote from the first loading dock 20; and causing the payload 30 to be removed from the cargo cradle 102 of the UAS 10. In some embodiments, the step of causing the payload 30 to pass through the first side wall 204a comprises drawing the payload 30 through the first side wall 204a and into the cargo cradle 102 in response to a vacuum pressure pulled in the cargo cradle 102, for example by operation of a blower motor 230 in operative communication with the cargo cradle 102. In some embodiments, the step of causing the payload 30 to be removed from the cargo cradle 102 comprises drawing the payload 30 from the cargo cradle 102 via an applied vacuum force through a side wall (204a) of a second loading dock 200 disposed at the predetermined destination.

In some embodiments, the method includes covering the basket 204 portion of the loading dock 200 with a cover 203b after the UAS 10 unmates from the loading dock 200, for example to prevent mating of the basket 204 with an undesired UAS and/or to prevent detritus from accumulating in the basket 204 when no UAS is mated to the basket 204.

EXAMPLES

Example 1. Cargo Cradle for UAS

A cargo cradle 102 consistent with the present disclosure was constructed of PVA filament using a 3D printer. The cargo cradle 102 featured a rounded trapezoidal cross-sectional shape generally consistent with FIGS. 21-23, a payload hold area 104 inside the cargo cradle 102, and a mounting bracket 103 disposed on its top surface 102c and configured to enable convenient coupling of the cargo cradle 102 to a UAS 10. The front side 102a' of the cargo cradle 102 included four small openings 106 through which air might pass but cargo 30 within the payload hold area 104 may not pass. The rear side 102a of the cargo cradle 102 (opposite the front side) included a large opening 105 through which payload 30 might pass into or out of the payload hold area 104, as desired.

Example 2. Loading Dock Basket

A loading dock basket 204 consistent with the present disclosure was constructed of PVA filament using a 3D printer. The loading dock 204 featured side walls 204a, 204a', 204b that formed a rounded trapezoidal shape complementary to the cargo cradle of Example 1. The rear wall 204a' of the basket 204 included an opening 206 permitting air to pass into or out of the basket 204, as desired—for example via a complementary duct in fluid communication with the opening 206. The opening 206 was disposed to be substantially in alignment with the four small openings 106 of the cargo cradle 102 of Example 1. The front wall 204a included an opening 205 permitting air to pass into or out of the basket 204, as desired—for example via a complementary duct in fluid communication with the opening 205. The opening 205 was disposed to be substantially in alignment with the large opening 105 of the cargo cradle 102 of Example 1. The basket 204 further included a base 202 extending from its lower surface and configured to enable the basket 204 to be secured to another surface.

Further Examples

Further Example 1. A cargo delivery system comprising:
an unmanned aircraft system (10) ("UAS") including a cargo cradle (102) configured to receive a payload (30); and
a loading system (20) including:
a loading dock (200) configured to reversibly mate with the cargo cradle,
a packing area (220) disposed remote from the loading dock and configured to receive the payload, and
a conveying duct (210) in operable communication with the loading dock and the packing area and configured to convey the payload from the packing area to the loading dock.

Further Example 2. The cargo delivery system of Further Example 1 further comprising at least one pneumatic blower motor (230) in operable communication with the conveying duct and configured to draw or push the cargo through the conveying duct towards the loading dock.

Further Example 3. The cargo delivery system of Further Example 1 or Further Example 2 further comprising wind deflectors (250) disposed proximal to the loading dock and configured to deflect wind (W) away from the loading dock.

Further Example 4. The cargo delivery system of any one preceding Further Example further comprising an air curtain generator (240) configured to direct air at an angle γ away from the loading dock.

Further Example 5. The cargo delivery system of any one preceding Further Example, wherein the loading dock (200) comprises:
a base (202); and
a basket (204) extending upwards from the base and including:
a first opening (205) sized and shaped to enable the payload (30) to pass therethrough, and a second opening (206) configured to enable air but not the payload to pass therethrough.

Further Example 6. The cargo delivery system of Further Example 5, wherein the basket (204) has an inverted truncated pyramidal shape with a side wall (204a) extending upward from the base (202) at an angle α.

Further Example 7. The cargo delivery system of Further Example 6, wherein the angle α is obtuse.

Further Example 8. The cargo delivery system of Further Example 6 or Further Example 7, wherein the inverted truncated pyramidal shape is an inverted truncated rectangular pyramid.

Further Example 9. The cargo delivery system of any one of Further Examples 6-8, wherein the inverted truncated pyramidal shape is not an inverted truncated square pyramid.

Further Example 10. The cargo delivery system of any one of Further Examples 5-9, wherein the loading dock (200) further comprises at least one guidance flap (208) extending upwards from the basket (204) at an angle β.

Further Example 11. The cargo delivery system of Further Example 10, wherein the angle β is about 95° to about 180°.

Further Example 12. The cargo delivery system of any one preceding Further Example, wherein loading dock (200) includes an indicator encoding information corresponding to an orientation of a loading axis associated with the loading dock.

Further Example 13. The cargo delivery system of any one preceding Further Example, wherein the cargo cradle (102) comprises a cargo hold area (104) configured to receive the cargo (30) therein.

Further Example 14. The cargo delivery system of Further Example 13, wherein the payload area (104) comprises:
  a first opening (105) sized and shaped to enable the payload (30) to pass therethrough, and
  a second opening (106) configured to enable air but not the payload to pass therethrough.

Further Example 15. The cargo delivery system of any one of Further Examples 5-14, wherein the cargo cradle (102) includes side walls (102a) configured to contact all or substantially all interior surfaces of side walls of the basket (204) when the UAS (10) is docked with the loading dock (200).

Further Example 16. The cargo delivery system of any one of Further Examples 6-15, wherein the cargo cradle (102) has an inverted truncated pyramidal shape with a side wall (102a) extending upward from a base (102d) at an angle δ.

Further Example 17. The cargo delivery system of Further Example 16, wherein the angle δ is obtuse.

Further Example 18. The cargo delivery system of Further Example 16 or Further Example 17, wherein the inverted truncated pyramidal shape is an inverted truncated rectangular pyramid.

Further Example 19. The cargo delivery system of any one of Further Examples 16-18, wherein the inverted truncated pyramidal shape is not an inverted truncated square pyramid.

Further Example 20. The cargo delivery system of any one preceding Further Example, wherein the UAS further comprises:
  a body (100) disposed above the cargo cradle (102); and
  at least one propeller (110) disposed above the body.

Further Example 21. A cargo cradle (102) for delivering cargo by UAS, the cargo cradle comprising:
  a shell including side walls (102a);
  a payload hold area (104) disposed within the shell and configured to receive payload (30) therein;
  a first opening (105) in a first side wall (102a) and in operative communication with the payload hold area, wherein the first opening is sized and shaped to enable the payload to pass therethrough; and
  a second opening (106) in a second side wall (102a) and in operative communication with the payload hold area, wherein the second opening is configured to enable air but not the payload to pass therethrough.

Further Example 22. The cargo cradle of Further Example 21, wherein the shell is sized and shaped such that the side walls (102a) contact all or substantially all interior surfaces of side walls of a basket (204) of a loading dock (200) when the UAS (10) is docked with the loading dock.

Further Example 23. The cargo cradle of Further Example 21 or Further Example 22, wherein the shell has an inverted truncated pyramidal shape.

Further Example 24. The cargo cradle of any one of Further Examples 21-23, wherein a side wall (102a) extends upward from a base (102d) of the shell at an angle δ.

Further Example 25. The cargo cradle of Further Example 24, wherein the angle δ is obtuse.

Further Example 26. The cargo cradle of any one of Further Examples 21-25, wherein the shell has an inverted truncated pyramidal shape.

Further Example 27. The cargo cradle of Further Example 26, wherein the inverted truncated pyramidal shape is an inverted truncated rectangular pyramid.

Further Example 28. The cargo cradle of Further Example 26 or Further Example 27, wherein the inverted truncated pyramidal shape is not an inverted truncated square pyramid.

Further Example 29. The cargo cradle of any one of Further Examples 21-28, wherein the payload hold area (104) has a shape that is generally circular or rectangular.

Further Example 30. The cargo cradle of Further Example 29, wherein the shape is a circular duct.

Further Example 31. The cargo cradle of any one of Further Examples 21-30, wherein the cargo cradle is configured to be coupled with a UAS.

Further Example 32. The cargo cradle of any one of Further Examples 21-31 further comprising:
  a door or gate (107) configured to selectively enable payload to enter or exit the payload hold area and prevent payload from entering or exiting the payload hold area; and
  a gate activator (109) configured to, upon activation, cause the door or gate to enable payload to enter or exit the payload hold area.

Further Example 33. The cargo cradle of Further Example 32, wherein the gate activator comprises a sensor configured to indicate whether the cargo cradle 102 is mated with a loading dock.

Further Example 34. An unmanned aircraft system ("UAS") comprising:
  a body portion (100);
  at least one propeller (110) disposed above the body portion; and
  a cargo cradle (102) disposed generally below the body portion and comprising:
    a plurality of sides (102a, 102b) that, together, form a wedge-shaped shell,
    a first opening (105) disposed through the wedge-shaped shell and configured to enable a payload (30) to pass therethrough, and a second opening (106) disposed through the wedge-shaped shell and configured to enable air but not the payload to pass therethrough.

Further Example 35. The UAS of Further Example 34, wherein the cargo cradle (102) further includes a base (102d) at a bottom end and a top (102c) opposite the base, wherein the base has a width less than a width of the top.

Further Example 36. The UAS of any one of Further Example 34 or Further Example 35, wherein the first opening (105) is generally circular or oval.

Further Example 37. The UAS of any one of Further Examples 34-36 further comprising a cargo hold area (104) disposed within the wedge-shaped shell.

Further Example 38. The UAS of Further Example 37, wherein the payload hold area (104) has a shape that is generally circular or rectangular.

Further Example 39. The UAS of any one of Further Examples 35-38, wherein at least one side (102a) extends from the base (102d) at a first angle δ, and wherein at least one side (102b) extends from the base (102d) at a second, different angle δ'.

Further Example 40. The UAS of Further Example 39, wherein the first angle δ and the second angle δ' are both obtuse.

Further Example 41. A loading dock (200) comprising a basket (204) including:
  a plurality of sides (204a, 204b) that, together, form a wedge shape,
  a first opening (205) disposed through a first side (204a) sized and shaped to enable a payload (30) to pass therethrough, and
  a second opening (206) disposed through a second side (204a, 204b) and configured to enable air but not the payload to pass therethrough.

Further Example 42. The loading dock of Further Example 41, wherein the wedge shape is an inverted truncated pyramidal shape.

Further Example 43. The loading dock of Further Example 41 or Further Example 42 further comprising a base (202) disposed at a bottom edge of the plurality of sides (204a, 204b).

Further Example 44. The loading dock of Further Example 43, wherein the first side wall (204a) extends upward from the base at an angle α.

Further Example 45. The loading dock of Further Example 44, wherein the angle α is obtuse.

Further Example 46. The loading dock of any one of Further Examples 42-45, wherein the inverted truncated pyramidal shape is an inverted truncated rectangular pyramid.

Further Example 47. The loading dock of any one of Further Examples 42-46, wherein the inverted truncated pyramidal shape is not an inverted truncated square pyramid.

Further Example 48. The loading dock of any one of Further Examples 42-45 further comprising at least one guidance flap (208) extending upwards from the basket (204) at an angle β.

Further Example 49. The loading dock of Further Example 48, wherein the angle β is about 95° to about 180°.

Further Example 50. A method of sending cargo by UAS to a predetermined destination, the method comprising:
  coupling the cargo cradle (102) of a UAS of any one of Further Examples 32-38 to a first loading dock (200) of any one of Further Examples 39-47;
  causing a payload (30) to pass through the first side wall (204a) of the loading dock and into the cargo cradle of the UAS; and
  thereafter uncoupling the UAS from the first loading dock;
  causing the UAS to travel to a predetermined destination that is remote from the first loading dock;
  coupling the UAS to a second loading dock associated with the predetermined destination; and
  causing the payload to be removed from the cargo cradle of the UAS.

Further Example 51. The method of Further Example 50, wherein the step of causing the payload to pass through the first side wall comprises drawing the payload through the first side wall and into the cargo cradle in response to a vacuum pressure pulled in the cargo cradle.

Further Example 52. The method of Further Example 50 or Further Example 51, wherein the step of causing the payload to be removed from the cargo cradle comprises drawing the payload from the cargo cradle via an applied vacuum force through a side wall (204a) of a second loading dock (200) disposed at the predetermined destination.

Further Example 53. The method of any one of Further Examples 50-52, wherein the step of causing the payload to pass through the first side wall (204a) of the loading dock comprises:
  placing the payload (30) in a packing area (220) associated with the loading dock (200);
  causing the payload to move to the loading dock via one or more conveyor ducts (210) in operable communication with the packing area and the loading dock; and
  thereafter causing the payload to exit the one or more conveyor ducts through the first side wall of the loading dock.

What is claimed is:

1. A cargo delivery system comprising:
  an unmanned aircraft system ("UAS") including a cargo cradle configured to receive a payload; and
  a loading system including:
    a loading dock configured to reversibly mate with the cargo cradle,
    a packing area disposed remote from the loading dock and configured to receive the payload, and
    a conveying duct in operable communication with the loading dock and the packing area and configured to convey the payload from the packing area to the loading dock.

2. The cargo delivery system of claim 1 further comprising at least one pneumatic blower motor in operable communication with the conveying duct and configured to draw or push the cargo through the conveying duct towards the loading dock.

3. The cargo delivery system of claim 1 further comprising a wind deflectors disposed proximal to the loading dock and configured to deflect wind away from the loading dock.

4. The cargo delivery system of claim 1 further comprising an air curtain generator configured to direct air at an angle γ away from the loading dock.

5. The cargo delivery system of claim 1, wherein the loading dock comprises:
  a base; and
  a basket extending upwards from the base and including:
    a first opening sized and shaped to enable the payload to pass therethrough, and a second opening configured to enable air but not the payload to pass therethrough.

6. The cargo delivery system of claim 5, wherein the basket has an inverted truncated pyramidal shape with a side wall extending upward from the base at an angle $\alpha$.

7. The cargo delivery system of claim 6, wherein the angle $\alpha$ is obtuse.

8. The cargo delivery system of claim 6, wherein the inverted truncated pyramidal shape is an inverted truncated rectangular pyramid.

9. The cargo delivery system of claim 6, wherein the inverted truncated pyramidal shape is not an inverted truncated square pyramid.

10. The cargo delivery system of claim 5, wherein the loading dock further comprises at least one guidance flap extending upwards from the basket at an angle $\beta$.

11. The cargo delivery system of claim 10, wherein the angle $\beta$ is about 95° to about 180°.

12. The cargo delivery system of claim 1, wherein loading dock includes an indicator encoding information corresponding to an orientation of a loading axis associated with the loading dock.

13. The cargo delivery system of claim 1, wherein the cargo cradle comprises a cargo hold area configured to receive the cargo therein.

14. The cargo delivery system of claim 13, wherein a payload area comprises:
a first opening sized and shaped to enable the payload to pass therethrough, and
a second opening configured to enable air but not the payload to pass therethrough.

15. The cargo delivery system of claim 5, wherein the cargo cradle includes side walls configured to contact all or substantially all interior surfaces of side walls of the basket when the UAS is docked with the loading dock.

16. The cargo delivery system of claim 6, wherein the cargo cradle has an inverted truncated pyramidal shape with a side wall extending upward from a base at an angle $\delta$.

17. The cargo delivery system of claim 16, wherein the angle $\delta$ is obtuse.

18. The cargo delivery system of claim 16, wherein the inverted truncated pyramidal shape is an inverted truncated rectangular pyramid.

19. The cargo delivery system of claim 16, wherein the inverted truncated pyramidal shape is not an inverted truncated square pyramid.

20. The cargo delivery system of claim 1, wherein the UAS further comprises:
a body disposed above the cargo cradle; and
at least one propeller disposed above the body.

* * * * *